(12) United States Patent
Miyauchi

(10) Patent No.: US 10,706,581 B2
(45) Date of Patent: Jul. 7, 2020

(54) IMAGE PROCESSING APPARATUS FOR CLIPPING AND SORTING IMAGES FROM READ IMAGE ACCORDING TO CARDS AND CONTROL METHOD THEREFOR

(71) Applicant: CANON KABUSHIKI KAISHA, Tokyo (JP)

(72) Inventor: Takashi Miyauchi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 15/819,068

(22) Filed: Nov. 21, 2017

(65) Prior Publication Data

US 2018/0174324 A1  Jun. 21, 2018

(30) Foreign Application Priority Data

Dec. 15, 2016 (JP) ................. 2016-243631

(51) Int. Cl.
*G06K 9/46* (2006.01)
*G06T 7/73* (2017.01)
(Continued)

(52) U.S. Cl.
CPC ............ *G06T 7/74* (2017.01); *G06K 9/00463* (2013.01); *G06K 9/00483* (2013.01); *G06T 7/73* (2017.01);
(Continued)

(58) Field of Classification Search
CPC ............ G06K 9/00463; G06K 9/00483; G06T 2207/10008; G06T 7/73; G06T 7/74;
(Continued)

(56) References Cited

U.S. PATENT DOCUMENTS

2009/0080782 A1* 3/2009 Konishi ............. G03G 15/5025
382/218
2010/0007763 A1* 1/2010 Yokohata ........... H04N 5/23212
348/222.1

(Continued)

FOREIGN PATENT DOCUMENTS

JP            2009100211 A      5/2009

*Primary Examiner* — Ian L Lemieux
(74) *Attorney, Agent, or Firm* — Rossi, Kimms & McDowell LLP

(57) ABSTRACT

An image processing apparatus estimates obverse and reverse pairs as obverse and reverse images of a plurality of cards even if positions of obverse and reverse images of respective cards shift when a user turns cards upside down to scan reverse images when scanning obverse and reverse images of cards and associating obverse and reverse images of cards with each other as obverse and reverse pairs, and presents estimated pairs to the user. A first image and second image are acquired to extract first and second rectangular images and central coordinate values thereof from acquired first and second images. When the central coordinate value extracted from the acquired second image is located within a predetermined distance from the central coordinate value extracted from the acquired first image, it is discriminated that the first rectangular image and second rectangular image as a combination serving as an obverse and reverse pair.

19 Claims, 15 Drawing Sheets

(51) Int. Cl.
  *G06K 9/00* (2006.01)
  *H04N 1/00* (2006.01)
(52) U.S. Cl.
  CPC ............... *H04N 1/00477* (2013.01); *G06T 2207/10008* (2013.01); *H04N 2201/0081* (2013.01); *H04N 2201/0094* (2013.01)
(58) Field of Classification Search
  CPC ....... H04N 1/00477; H04N 2201/0081; H04N 2201/0094
  See application file for complete search history.

(56) References Cited

U.S. PATENT DOCUMENTS

| | | | |
|---|---|---|---|
| 2013/0343609 A1* | 12/2013 | Wilson ............... | G06K 9/00463 382/103 |
| 2017/0230531 A1* | 8/2017 | Takahashi ............ | H04N 1/2338 |
| 2017/0230538 A1* | 8/2017 | Ono ..................... | H04N 1/3876 |

* cited by examiner

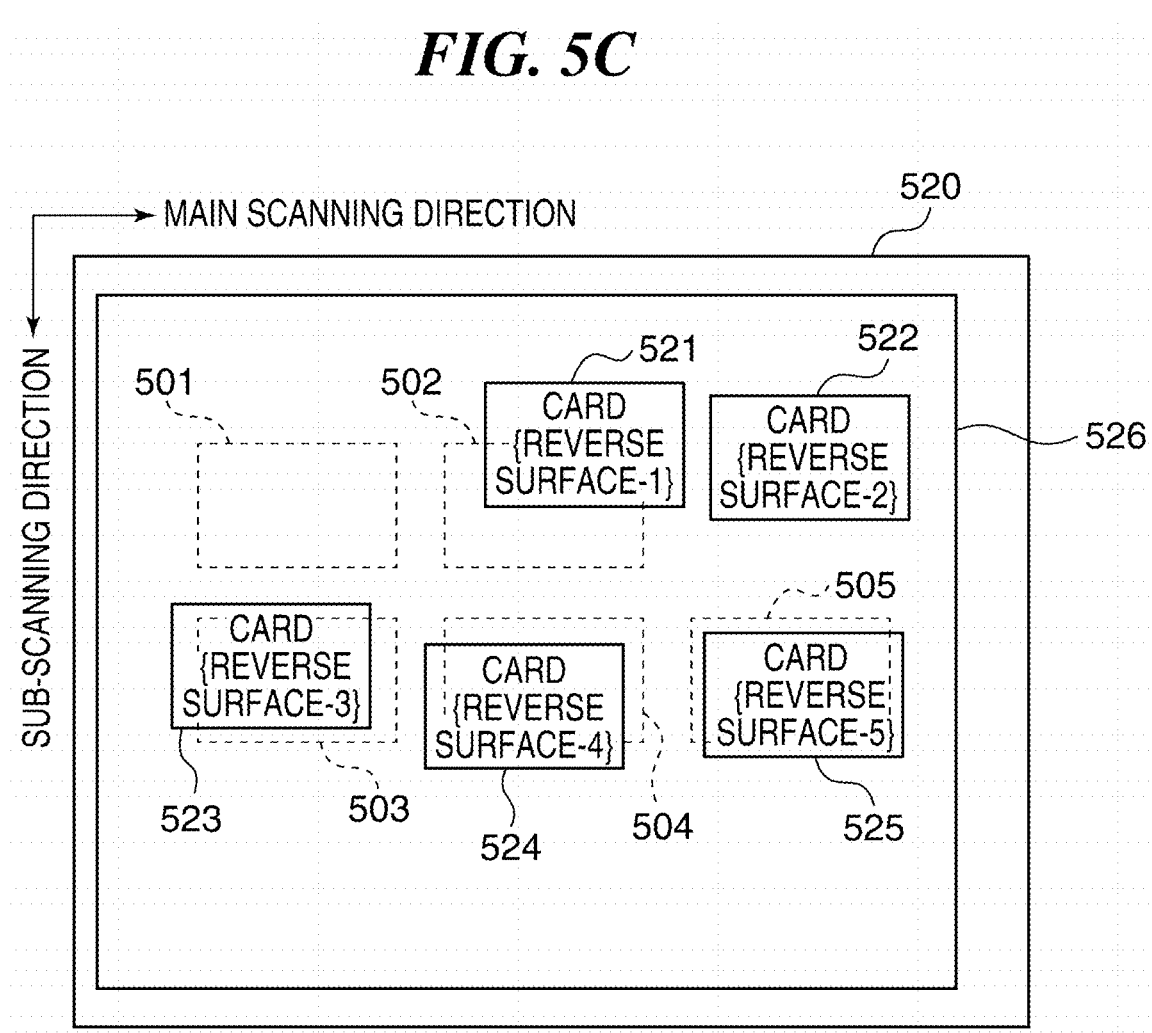

FIG. 11

| CONDITION | CARDS WITH SURFACES FOR WHICH OBVERSE AND REVERSE ASSOCIATION IS CHECKED | |
|---|---|---|
| | OBVERSE IMAGE | REVERSE IMAGE |
| CASE SATISFYING "NUMBER OF OBVERSE IMAGES = NUMBER OF REVERSE IMAGES" | ○ | ○ |
| CASE SATISFYING "NUMBER OF OBVERSE IMAGES > NUMBER OF REVERSE IMAGES" | ○ | |
| CASE SATISFYING "NUMBER OF OBVERSE IMAGES < NUMBER OF REVERSE IMAGES" | | ○ |

IMAGE PROCESSING APPARATUS FOR CLIPPING AND SORTING IMAGES FROM READ IMAGE ACCORDING TO CARDS AND CONTROL METHOD THEREFOR

BACKGROUND OF THE INVENTION

Field of the Invention

The present invention relates to an image processing apparatus for acquiring images of a plurality of cards, such as name cards, arranged side by side by using an image reader such as a scanner and clipping and sorting the images according to the cards and a control method therefor.

Description of the Related Art

Conventionally, there has been disclosed a technique for acquiring images of a plurality of cards such as name cards or license cards arranged side by side on the platen of an image reader such as a scanner as a single read image, clipping images from the read image, and sorting the images according to the cards.

Preferably, pieces of information on the obverse and reverse surfaces of a double-sided printed card such as a name card or license card are integrally managed for convenience. For this reason, there is a need to generate a composite file including pieces of information on the obverse and reverse surfaces. In order to generate composite files each including pieces of information on the obverse and reverse surfaces, it is necessary to clip and sort obverse read images and reverse read images of the respective cards according to the cards and combine the obverse and reverse images of each card.

Japanese Laid-Open Patent Publication (kokai) No. 2009-100211 discloses the following technique as a method for combining the obverse and reverse images of each card. First of all, obverse read images of a plurality of cards arranged side by side on a platen are obtained, and the respective cards are turned upside down at the same positions on the platen to acquire reverse read images. The position information of each image of each card is then calculated from a corresponding one of the read images, and the obverse and reverse images of each card are combined on the basis of the calculated position information.

According to Japanese Laid-Open Patent Publication (kokai) No. 2009-100211, however, the central coordinate values of each card image are calculated as the position information of each image of each card. For this reason, if the position of a given card shifts when it is turned upside down, the central coordinate values of the obverse and reverse images of the card also shift. This sometimes results in a failure to decide a proper combination of obverse and reverse images. In addition, if the positions of cards greatly shift when they are turned upside down, the obverse and reverse images of different cards are sometimes combined.

In such a case, the user needs to check whether obverse and reverse images are properly combined. When reading images using a scanner device having an A3-size platen, the user can simultaneously scan several dozen name cards each having a regular name card size. Consequently, it requires a very cumbersome operation to display the obverse and reverse images of all the cards on the basis of the position information of each image and make the user select desired combinations.

SUMMARY OF THE INVENTION

The present invention provides an image processing apparatus that can estimate obverse and reverse pairs as the obverse and reverse images of a plurality of cards even if the positions of the obverse and reverse images of the respective cards shift when a user turns the cards upside down to scan the reverse images at the time of scanning the obverse and reverse images of the cards and associating the obverse and reverse images of the cards with each other as obverse and reverse pairs, and present the estimated pairs to the user, and a control method for the apparatus.

Accordingly, the first embodiment of the present invention provides an image processing apparatus comprising an image acquisition unit configured to acquire a first image and a second image, a first extraction unit configured to extract a first rectangular image and a central coordinate value thereof from the first image acquired by the image acquisition unit, a second extraction unit configured to extract a second rectangular image and a central coordinate value thereof from the second image acquired by the image acquisition unit, and a first discrimination unit configured to discriminate the first rectangular image and the second rectangular image as a combination serving as an obverse and reverse pair when the central coordinate value extracted by the second extraction unit is located within a predetermined distance from the central coordinate value extracted by the first extraction unit.

Accordingly, the second embodiment of the present invention provides an image processing apparatus comprising a first extraction unit configured to extract a first surface image of each of a plurality of documents placed on a platen from a first platen image acquired by reading first surfaces of the documents, a second extraction unit configured to extract a second surface image of each of the documents placed on the platen from a second platen image acquired by reading second surface images of the documents, an estimation unit configured to estimate the second surface image corresponding to the first surface image with respect to each of the documents by using feature information of the extracted first surface image of each document and the extracted second surface image of each document, and a display control unit configured to display the first surface and the second surface on a screen based on an estimation result obtained by the estimation unit.

According to the present invention, it is possible to estimate obverse and reverse pairs as the obverse and reverse images of a plurality of cards even if the positions of the obverse and reverse images of the respective cards shift when a user turns the cards upside down to scan the reverse images at the time of scanning the obverse and reverse images of the cards and associating the obverse and reverse images of the cards with each other as obverse and reverse pairs and to present the estimated pairs to the user.

Further features of the present invention will become apparent from the following description of exemplary embodiments (with reference to the attached drawings).

BRIEF DESCRIPTION OF THE DRAWINGS

FIGS. 5A to 5C are views each showing an example of the arrangement of a plurality of cards on a platen of a scanner unit in FIG. 2 at the time of reading the obverse and reverse images of the respective cards by card read processing in FIG. 3.

FIG. 11 is a view showing a table indicating an association determination method for card obverse and reverse pairs according to the second embodiment of the present invention.

DESCRIPTION OF THE EMBODIMENTS

The embodiments of the present invention will be described in detail below with reference to the accompanying drawings. Note, however, that the constituent elements described in these embodiments are merely exemplary, and the scope of the present invention is not limited to them.

First Embodiment

<System Arrangement>

Figure 1:
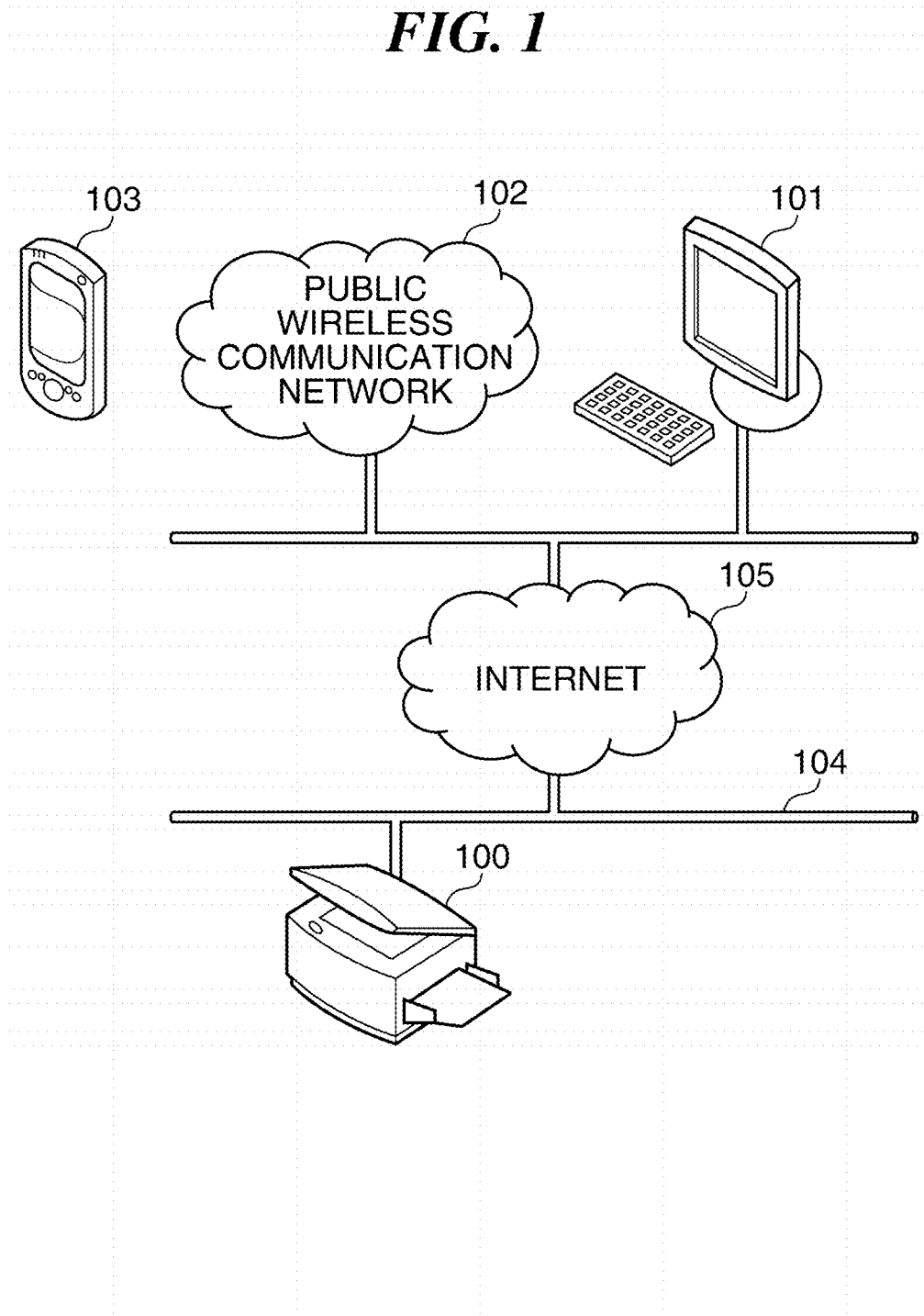
FIG. 1 is a view showing the overall arrangement of a system including an image processing apparatus according to the first embodiment of the present invention.

FIG. 1 is a view showing the overall arrangement of a system including an image processing apparatus according to the first embodiment of the present invention.

As shown in FIG. 1, an image processing apparatus 100 and a terminal such as a PC (to be simply referred to as a "PC" hereinafter) 101 are connected to a LAN 104 implemented by Ethernet (registered trademark), a wireless LAN, and the like, and are connected to Internet 105. A mobile terminal 103 is connected from a public wireless communication network 102 to the Internet 105 via the LAN 104 or directly. The image processing apparatus 100, the PC 101, and the mobile terminal 103 are connected from the LAN 104 or the public wireless communication network 102 to the Internet 105, and can communication with each other. It should be noted that this system may include either the PC 101 or the mobile terminal 103, or may include only the image processing apparatus 100.

The image processing apparatus 100 is multifunctional peripheral including a display/operation unit 121, a scanner unit 120, and a printer unit 123, which will be described later with reference to FIG. 2. The system according to the present embodiment uses the image processing apparatus 100 as a scan terminal for a plurality of cards such as name cards, license cards, and post cards. The display/operation unit 121 includes a display unit and operation units such as a touch panel and hard buttons, each of which functions as a user interface (UI), and displays error notices and instruction notices and performs operations such as a scanning operation and a setting operation. It should be noted that although the image processing apparatus 100 includes the printer unit 123, the apparatus is not limited to this arrangement as long as the apparatus can be used as a scan terminal.

The PC 101 displays the image acquired by the image processing apparatus 100. The PC 101 includes PC applications and the like, saves the image acquired from the image processing apparatus 100, and generates reusable metadata by executing optical character recognition (OCR) processing and the like. Furthermore, the PC 101 can communicate with external storages such as a cloud storage and a server and transmit saved images and metadata to external storages. Although, in the present embodiment, the PC 101 performs the above processing such as saving images, generating metadata, and transmitting data to external storages, this is not exhaustive. For example, the image processing apparatus 100 may be provided with the same functions as those of the PC 101 to perform the above processing performed by the PC 101.

In addition, the mobile terminal 103 is a smartphone or tablet terminal including an operation unit, a wireless communication unit, and an application unit that operates a Web browser. Like the PC 101, in the system according to the present embodiment, the mobile terminal 103 can be used as a display terminal, operation terminal, and metadata generating/saving terminal. It should be noted that the PC 101 and the mobile terminal 103 include overlapping functions such as a display function, operation function, and metadata generating/saving function, and hence either of them can be used.

The above constituent elements are merely exemplary, and all the elements are not always required. If, for example, the image processing apparatus 100 includes an image saving function, a metadata generation function, a metadata saving function, and a transmission function with respect to external storages, the image processing apparatus 100 may be used alone.

<Hardware Arrangement of Image Processing Apparatus 100>

Figure 2:
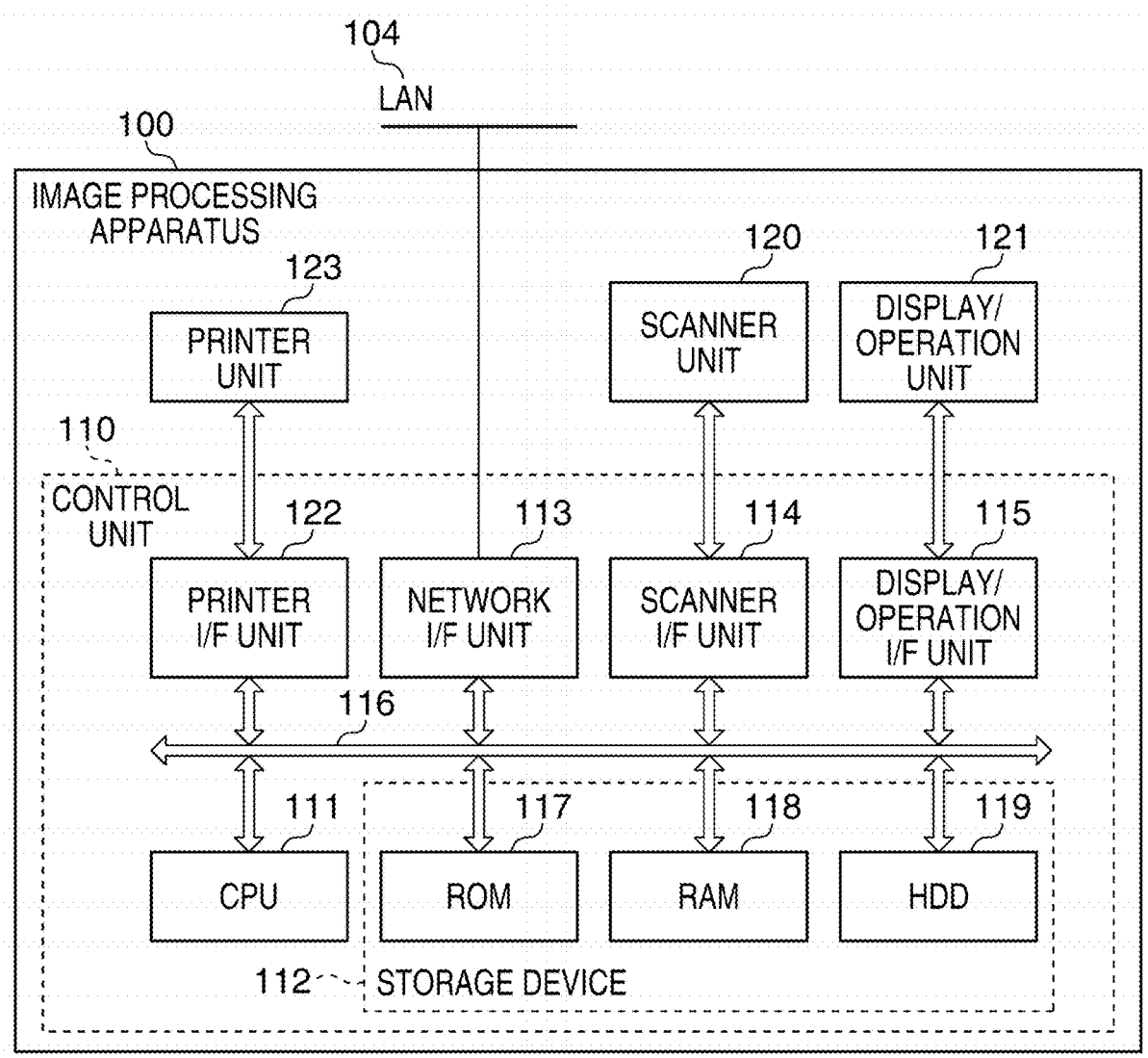
FIG. 2 is a block diagram showing the hardware arrangement of the image processing apparatus.

FIG. 2 is a block diagram showing the hardware arrangement of the image processing apparatus 100. The following are mutually communicably connected to a control unit 110 via a system bus 116: a CPU 111, a storage device 112, a network I/F unit 113, a scanner I/F unit 114, a display/operation I/F unit 115, and a printer I/F unit 122. The control unit 110 controls the overall operation of the image processing apparatus 100.

The CPU 111 reads out control programs stored in the storage device 112, and performs various types of control operations such as read control and transmission control.

The storage device 112 stores and holds the programs, images, metadata, and setting data, which have been described above, together with processing result data and the like. The storage device 112 includes a ROM 117 as a nonvolatile memory, a RAM 118 as a volatile memory, and an HDD 119 as a large-capacity storage area.

The ROM 117 holds control programs and the like, and the CPU 111 reads out the control programs from the ROM 117 to perform control operations.

The RAM 118 is used as the main memory of the CPU 111 and a temporary storage area such as a work memory.

The network I/F unit 113 connects the control unit 110 to the LAN 104 via the system bus 116. The network I/F unit 113 transmits image data to an external apparatus (the PC 101 or the mobile terminal 103 in the present embodiment) connected via the LAN 104, and receives various types of information from external apparatuses on the LAN 104.

The scanner I/F unit 114 connects the scanner unit 120 to the control unit 110 via the system bus 116. The scanner unit 120 generates image data by reading an image on a document, and inputs the image data to the control unit 110 via the scanner I/F unit 114.

The display/operation I/F unit 115 connects the display/operation unit 121 to the control unit 110 via the system bus 116. The display/operation unit 121 includes a liquid-crystal display unit having a touch panel function and a keyboard.

In addition to the above units, the image processing apparatus 100 includes the printer I/F unit 122 and the printer unit 123. However, these units are not used in the present embodiment, and hence a description of them will be omitted.

As described above, the image processing apparatus 100 according to the present embodiment can provide an image processing function using the above hardware arrangement.

<Image Processing Function>

The image processing function according to the present embodiment will be described.

The image processing apparatus 100 according to the present embodiment acquires an image (first image) by simultaneously scanning one surface (the obverse surface in this case) of each of a plurality of double-sided printed cards arranged on the platen of the scanner unit 120. The image processing apparatus 100 extracts an image of each card from the acquired image, and acquires a plurality of obverse images (first rectangular images).

The user then turns upside down the above cards, whose obverse surfaces have undergone scanning, on the platen, and the image processing apparatus 100 acquires an image (second image) by simultaneously scanning the surfaces (the reverse surfaces in this case) which have not undergone scanning. The image processing apparatus 100 extracts an image of each card from the acquired image and acquires a plurality of reverse images (second rectangular images).

The image processing apparatus 100 estimates obverse and reverse pairs of the respective cards from the acquired obverse and reverse images, and presents the estimated pairs to the user via the UI of the display/operation unit 121 shown in FIGS. 9 and 10 to be described later. In this case, an obverse and reverse pair is obtained by associating one surface of a double-sided printed card as an obverse surface with the other surface as a reverse surface so as to combine the two surfaces into a pair of obverse and reverse surfaces. When the user decides images as obverse and reverse pairs via the UI of the display/operation unit 121, the image processing apparatus 100 generates obverse and reverse image pairs (combined data).

The image processing apparatus 100 according to the present embodiment has the above image processing function. In addition, the present embodiment will exemplify name cards below as the cards, but this is not exhaustive. The present embodiment can be applied to any types of cards as the cards as long as they are double-sided printed cards such as license cards, insurance cards, various types of cards, and post cards.

The arrangement of the image processing function and its image processing procedure according to the embodiment will be described below.

Figure 3:
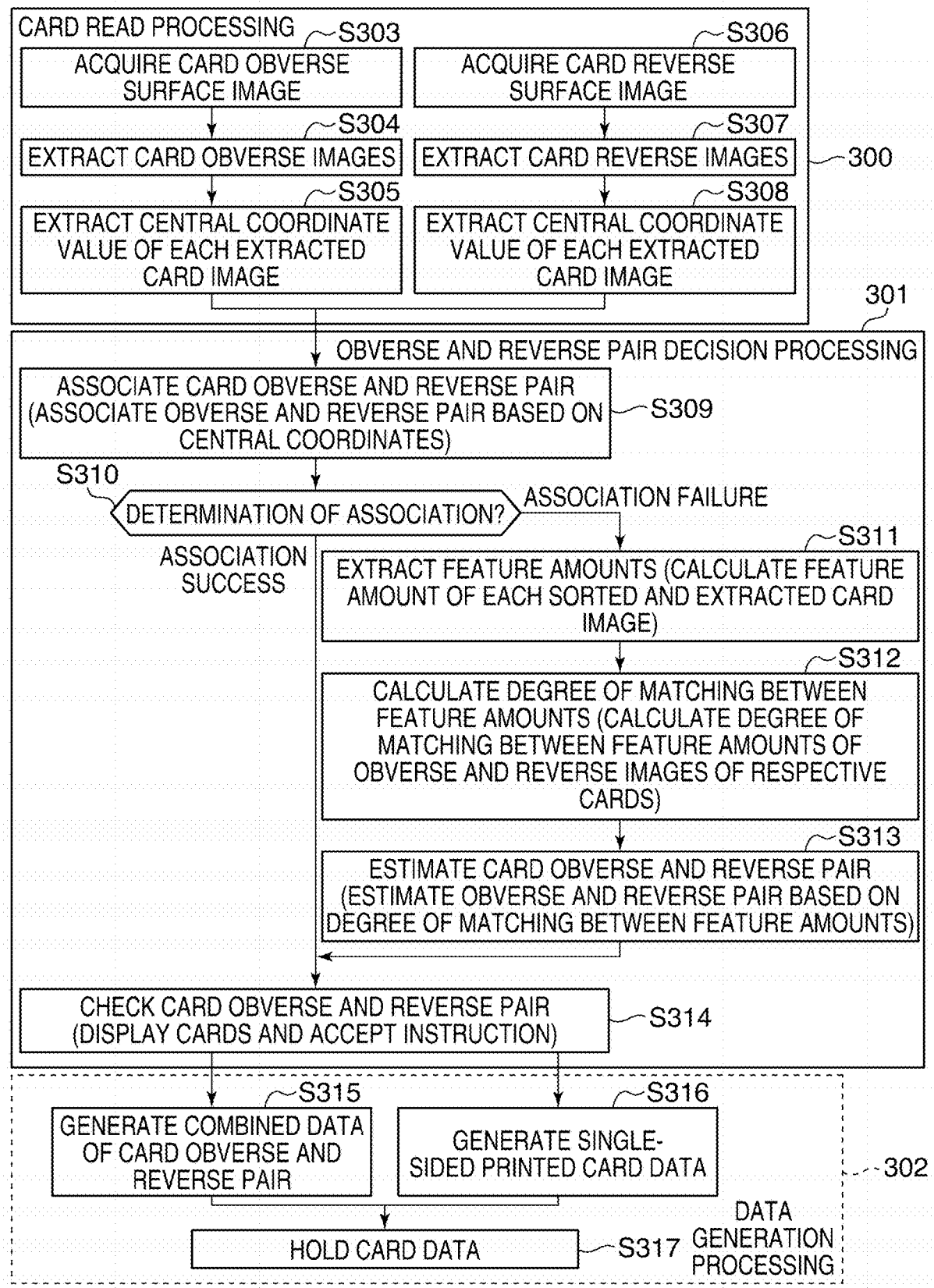
FIG. 3 is a flowchart showing an image processing procedure according to the first embodiment of the present invention.

FIG. 3 is a flowchart showing an image processing procedure according to the first embodiment of the present invention.

FIG. 3 explains the image processing according to the present embodiment, which includes scanning the two surfaces of each of a plurality of cards, sorting the read images, estimating the obverse and reverse pairs of the respective cards, presenting the estimated pairs to the user to decide obverse and reverse pairs, and generating image of the obverse and reverse pairs. The image processing apparatus 100 executes this image processing. More specifically, the CPU 111 of the image processing apparatus 100 executes processing in each step in FIG. 3 by loading a processing program stored in the ROM 117 into the RAM 118 and executing the program. As shown in FIG. 3, this flowchart is roughly constituted by card read processing 300, obverse and reverse pair decision processing 301, and data generation processing 302.

<Detailed Description of Card Read Processing 300>

The card read processing 300 will be described first with reference to FIGS. 3, 4A, 4B, 5A, 5B, 5C, and 6.

Figure 4A:
FIGS. 4A and 4B are views showing an example of obverse and reverse images of a card subjected to card read processing in FIG. 3.
Figure 4B:
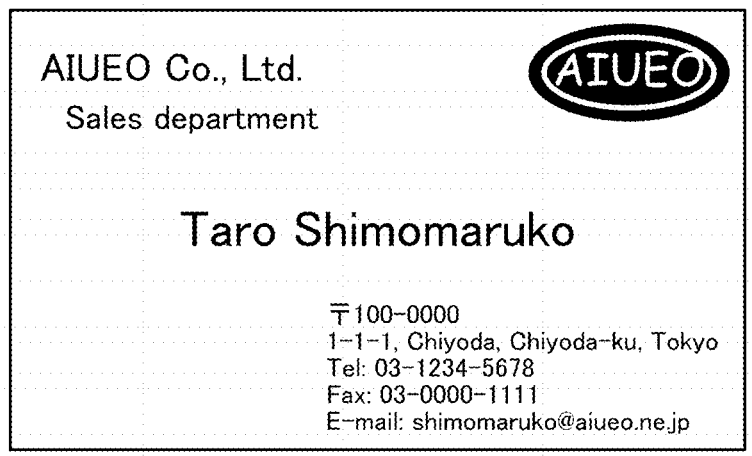
Figure 5A:
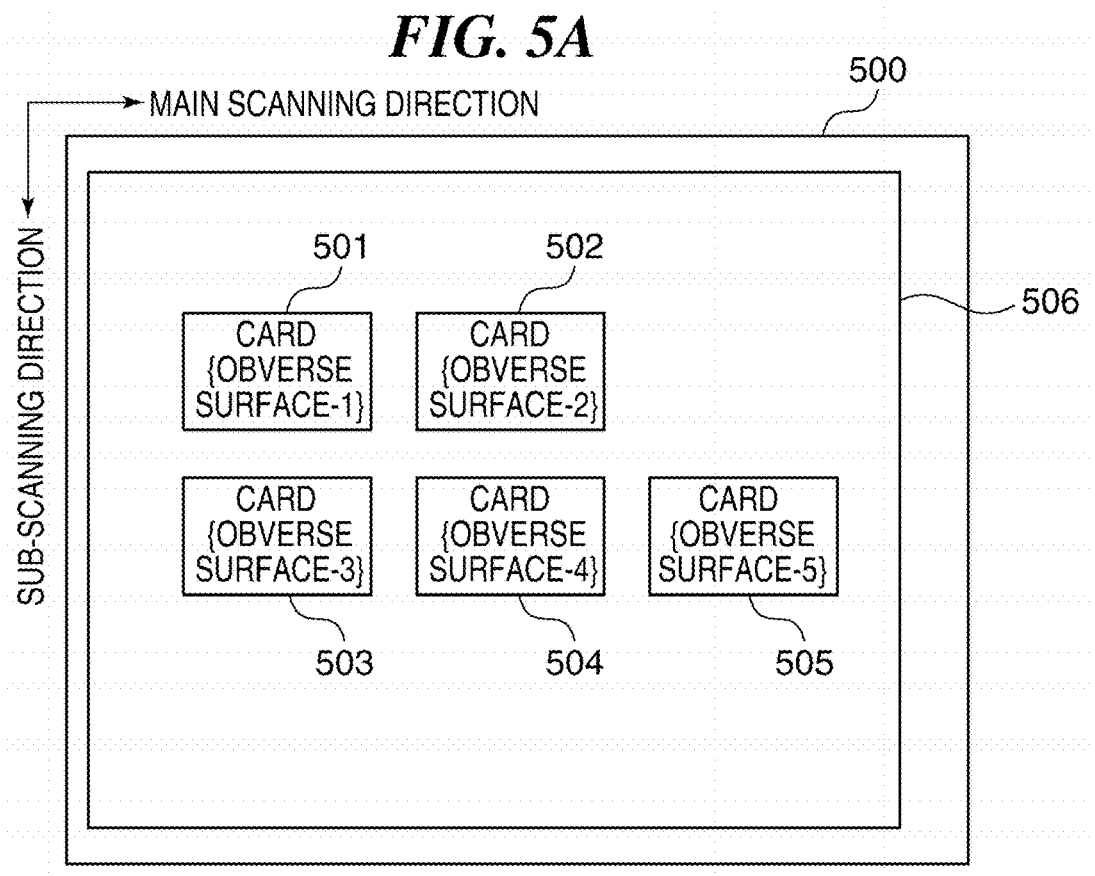
Figure 5B:
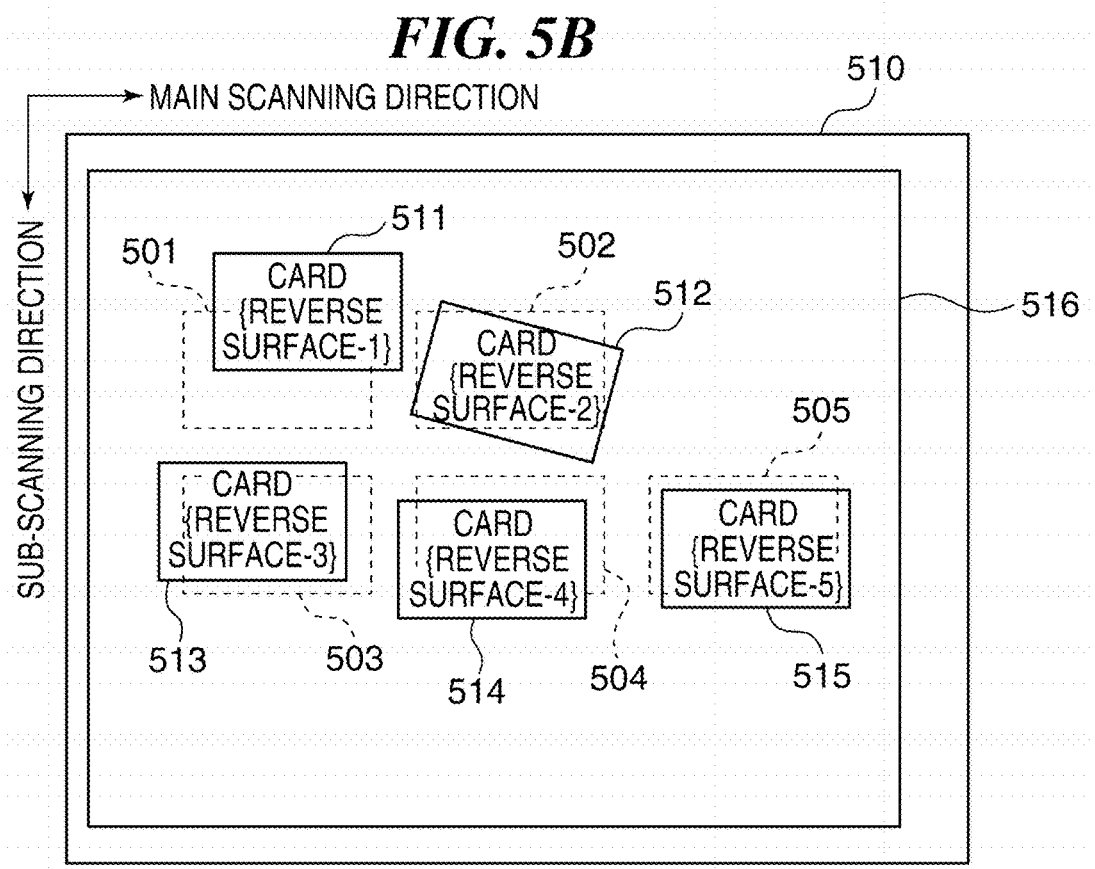
Figure 6:
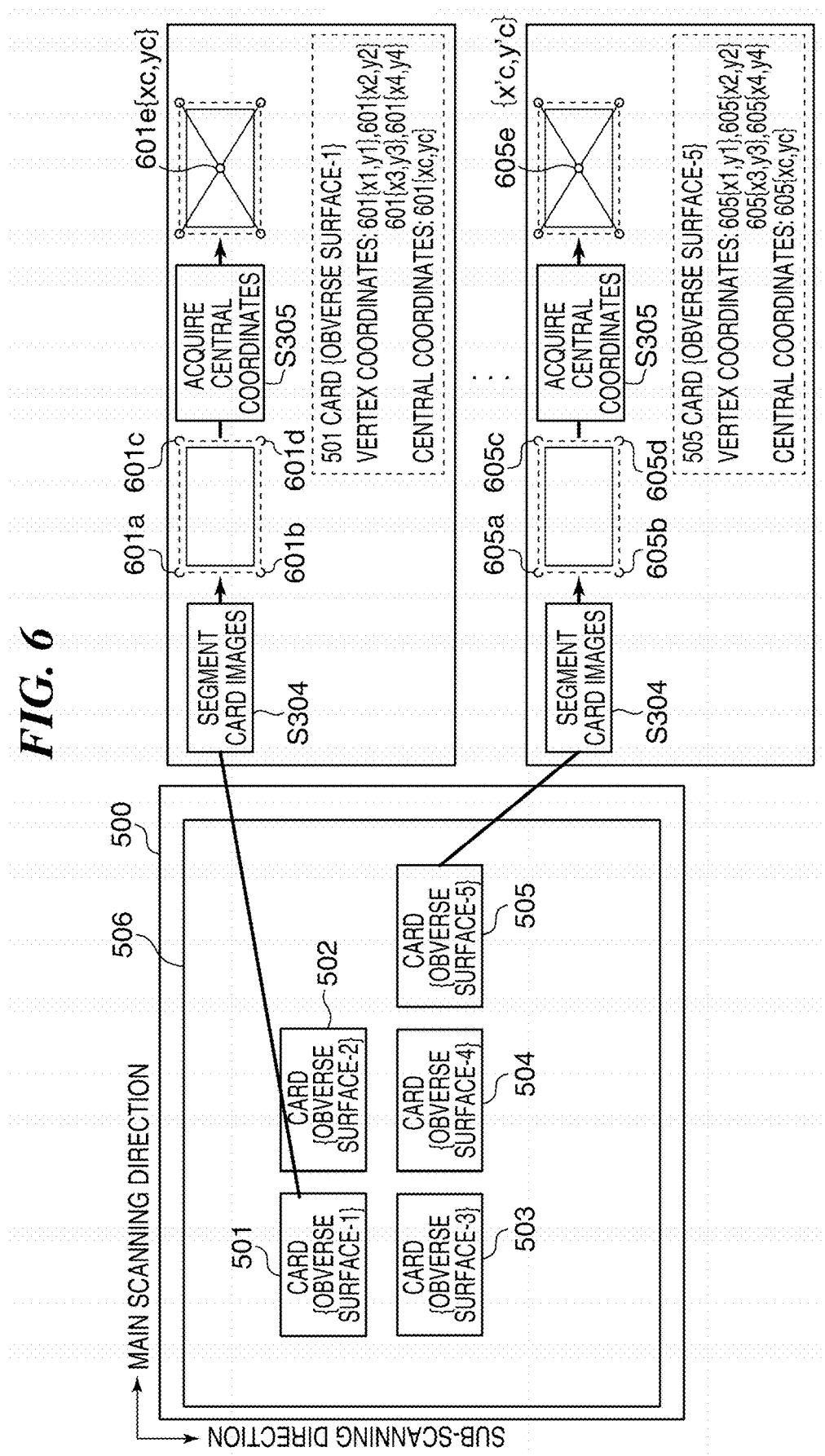
FIG. 6 is a view for explaining a method for extracting the obverse images of cards by card read processing in FIG. 3 and the central coordinate values of the images.

FIGS. 4A and 4B are views showing an example of obverse and reverse images of a double-sided printed card subjected to the card read processing 300 in FIG. 3. FIGS. 5A to 5C are views each showing an example of the arrangement of a plurality of cards on the platen of the scanner unit 120 in FIG. 2 at the time of reading the obverse and reverse images of the respective cards by the card read processing 300 in FIG. 3. FIG. 6 is a view for explaining a method for extracting the obverse images of the cards by the card read processing 300 in FIG. 3 and the central coordinate values of the images.

In step S303 in FIG. 3, the CPU 111 scans the obverse surfaces of a plurality of double-sided printed cards by the scanner unit 120, and acquires the read images from the scanner unit 120. Because the present embodiment exemplifies name cards as the plurality of double-sided printed cards, the obverse image of a name card like that shown in FIG. 4A is acquired. It should be noted that although the surface shown in FIG. 4A is the obverse surface of the double-sided printed name card, the surface shown in FIG. 4B may be the obverse surface of the name card. The user arranges a plurality of name cards with different written contents on a platen 500 on the scanner unit 120 shown in FIG. 5A. According to the present embodiment, five cards with different written contents are arranged such that their obverse surfaces come into contact with the platen 500, and then are scanned. An image of an area 506 actually acquired by the scanner unit 120 is acquired as a read image in step S303. In this case, each of the area 506 and areas 516 and 526 to be described later with reference to FIGS. 5B and 5C is a whole area of a reading surface of the platen of the scanner unit 120, and hence the each area has the same size. Hereinafter, the images of the areas 506, 516, 526 to be acquired by scanning the platen with a plurality of cards arranged thereon are called as platen images.

In step S304, the CPU 111 extracts the obverse images of the respective cards from the read image acquired in step S303. This makes it possible to separately acquire the obverse images of the cards which are included in the read image acquired in step S303. In the case shown in FIG. 5A, the CPU 111 acquires obverse images 501 to 505 of the five cards by extracting areas (to be referred to as "card areas" hereinafter) in which the respective cards are located from the platen image of the area 506. The processing of extracting only a plurality of card areas from the read image acquired in step S303 is implemented by a known segmentation method such as a method for clipping areas on the basis of the frame edges of the respective cards. In this case, as shown in FIG. 6, the CPU 111 also acquires the coordinate values of the four vertices of an image in each card area. For example, as shown in FIG. 6, the CPU 111 acquires four coordinate values, namely, {x1, y1}, {x2, y2}, {x3, y3}, and {x4, y4} as the coordinate values of four vertices 601a to 601d of the obverse image 501 of the card disposed on the upper left end of the platen 500. Likewise, the CPU 111 acquires the coordinate values of the four vertices of each of the acquired obverse images 502 to 505 of the remaining cards. If any of the card areas of the images 502 to 505 tilts, the CPU 111 acquires the coordinate values of the four vertices of the obverse image of the corresponding card upon performing tilt correction. A known technique can be used as a tilt correction method. For example, the CPU 111 can perform correction by tilt angle estimation using the coordinate values of the four vertices. It is also possible to implement tilt correction by performing projection transformation from the coordinate values of the four vertices.

In step S305, the CPU 111 extracts the central coordinate value of the obverse image of the each card extracted in step S304. More specifically, the CPU 111 calculates the central coordinate value on the basis of the coordinate values of the four vertices acquired in step S304. A known technique may be used as a method for calculating central coordinate values. For example, as shown in FIG. 6, a central coordinate value can be calculated from the intersection point between a straight line connecting coordinate values {x1, y1} and {x4, y4} of the vertices 601a and 601d and a straight line connecting coordinate values {x2, y2} and {x3, y3} of the vertices 601b and 601c. Likewise, the CPU 111 acquires the central coordinate values of the remaining cards acquired in step S304.

Processing in steps S306 to S308 is processing after the obverse image of each card is acquired by scanning the obverse surface, and is executed after the user turns the respective cards upside down on the platen 500. Processing in steps S306 to S308 is similar to that in steps S303 to S305.

In step S306, the CPU 111 scans the reverse surfaces of the plurality of double-sided printed cards whose obverse surfaces have been scanned in step S303, and acquires the read images from the scanner unit 120. In the present embodiment, the reverse images of the name cards shown in FIG. 4B are acquired. It should be noted that although the surface shown in FIG. 4B is the reverse surface of the double-sided printed name card, the surface shown in FIG. 4A may be the reverse surface of the name card. FIGS. 5B and 5C each show an example of the arrangement set by turning the five cards shown in FIG. 5A upside down. The CPU 111 acquires, as a read image, the platen image of the area 516 shown in FIG. 5B (the platen image of the area 526 in FIG. 5C) acquired by the scanner unit 120. Referring to FIGS. 5B and 5C, the obverse images 501 to 505 are shown in broken line rectangles to indicate the positions of the respective cards whose obverse surfaces have been scanned. In the case shown in FIG. 5B, although the obverse images 501 to 505 respectively correspond to reverse images 511 to 515, the positions of the respective cards shift a little when they are turned together upside down. In the case shown in FIG. 5C, although the obverse images 501 to 505 respectively correspond to reverse images 521 to 525, the positions of the two cards arranged on the upper portion of the platen 500 have greatly shifted when they were turned upside down.

In step S307, the CPU 111 extracts the reverse images of the respective cards from the read image acquired in step S306. This makes it possible to separately acquire the reverse images of the cards included in the read image acquired in step S306. In the case shown in FIG. 5B, the CPU 111 acquires the reverse images 511 to 515 of the five cards by extracting a plurality of card areas from the platen image of the area 516. In the case shown in FIG. 5C, the CPU 111 acquires the reverse images 521 to 525 of the five cards by extracting a plurality of card areas from the platen image of the area 526. A method for extracting the reverse images of the respective cards from the read image is the same as that used in step S304.

In step S308, the CPU 111 extracts the central coordinate value of the reverse image of the each card extracted in step S307. More specifically, the CPU 111 extracts the central coordinate value by calculating the central coordinate value on the basis of the coordinate values of the four vertices acquired in step S308. This method for calculating central coordinate values is the same as that used in step S305.

As described above, the images of the respective cards and coordinate information acquired in steps S303 to S305 and S306 to S308 are held in a predetermined storage area (for example, the RAM 118). The card read processing 300 executes the above operation.

<Detailed Description of Obverse and Reverse Pair Decision Processing 301>

The obverse and reverse pair decision processing 301 will be described with reference to FIGS. 3, 5A, 5B, 5C, 7A, 7B, 7C, 8, and 9.

Figure 7A:
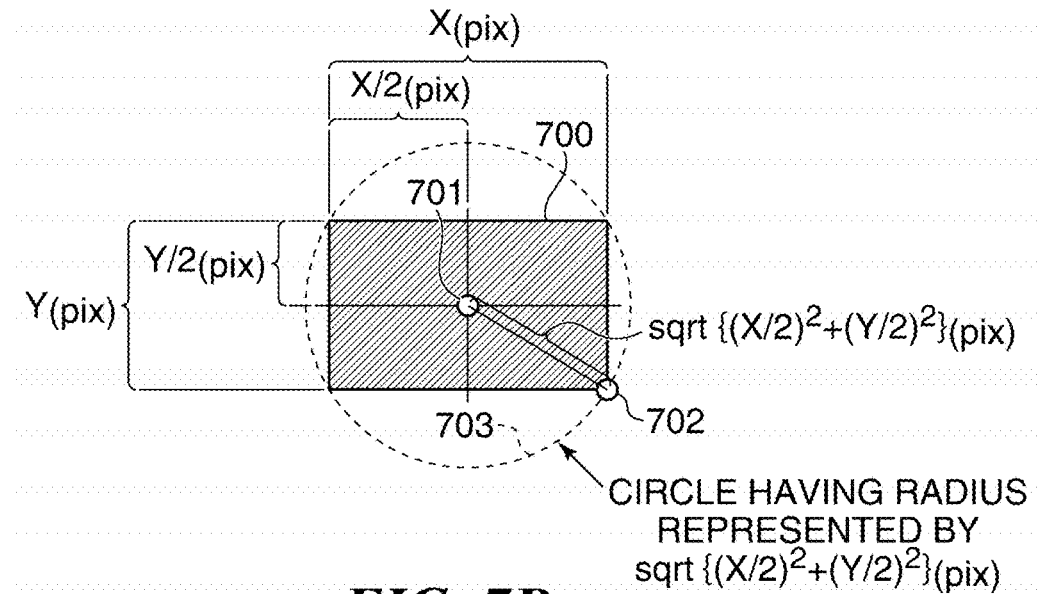
FIGS. 7A to 7C are views for explaining a method for associating obverse and reverse pairs based on the position information of each card, which is executed in a step in FIG. 3.
Figure 7B:
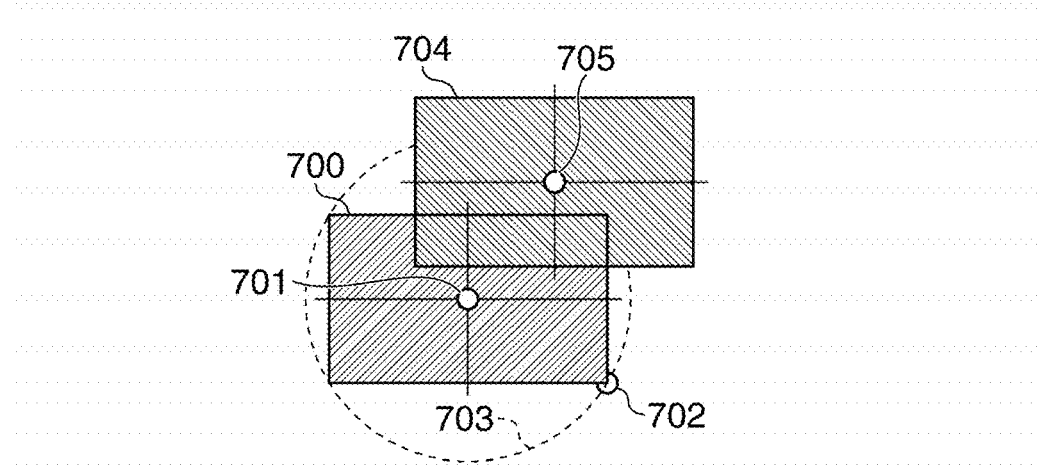
Figure 7C:
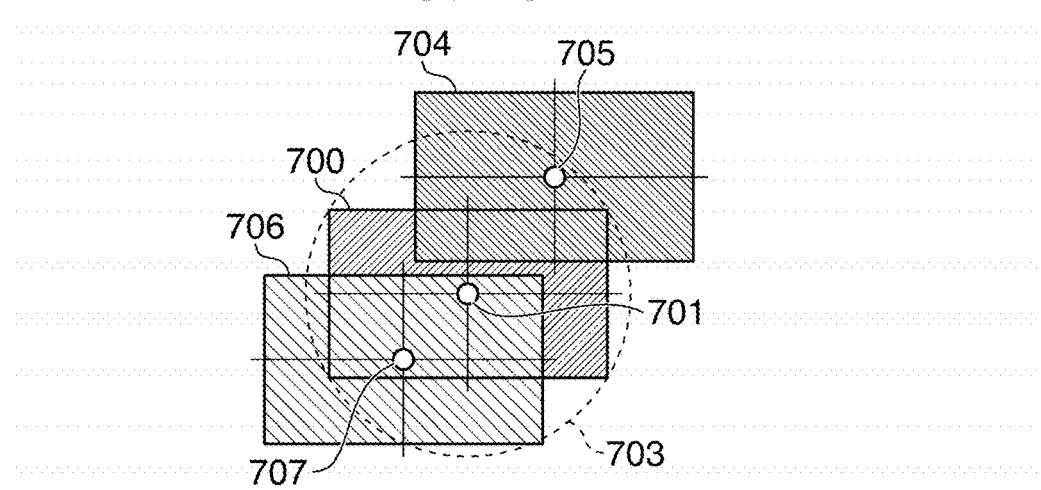

First of all, in step S309 in FIG. 3, the CPU 111 associates the obverse images extracted in step S304 with the reverse images extracted in step S307 as obverse and reverse pairs by the method in FIGS. 7A to 7C.

As shown in FIGS. 7A to 7C, when the central coordinate value of any one of the reverse images of the cards extracted in step S307 is located within a predetermined distance from the central coordinate value of an obverse image 700 of one card extracted in step S305, the CPU 111 associates the obverse and reverse images as an obverse and reverse pair.

FIG. 7A shows the area of the obverse image 700 of one card extracted in step S305. A numeric reference 701 indicates the central coordinate of the obverse image 700, and a numeric reference 702 indicates one of the four vertices of the obverse image 700. The coordinate values of the central coordinates 701 and the vertex 702 are those extracted in steps S304 and S305. A dotted line circle 703 is a circle centered on the central coordinate 701, with the distance between the central coordinates 701 and the vertex 702 being a radius. The distance between the central coordinates 701 and the vertex 702 is represented by sqrt $\{(X/2)^2+(Y/2)^2\}$, where X is the width of the card and Y is the length of the card. In the present embodiment, obverse and reverse pair association is performed depending on whether central coordinates of the reverse image of a card are located inside the circle 703. The CPU 111 determines whether the central coordinate values of all the reverse images extracted in step S308 are located inside the area of the circle 703.

FIG. 7B shows the area of a reverse image 704 of one card extracted in step S305. Because only the central coordinate value (central coordinates 705) of the reverse image 704, among the central coordinate values of the respective cards extracted in step S308, is included in the area of circle 703, the CPU 111 associates the obverse image 700 with the reverse image 704 as an obverse and reverse image pair of one card. If none of the central coordinates of the respective cards extracted in step S308 is not located inside the area of the circle 703, the CPU 111 determines that no image associated as the reverse image of the card whose obverse image 700 has been extracted is extracted in step S305.

FIG. 7C shows a case in which the central coordinates of the reverse images of a plurality of cards exist in the area of the circle 703. The central coordinates 705 of the reverse image 704 of one card extracted in step S305 and central coordinates 707 of a reverse image 706 of another card extracted in step S305 exist in the area of the circle 703. In this case, the CPU 111 calculates the distance between the central coordinates 705 and the central coordinates 701 and the distance between the central coordinates 707 and the central coordinates 701, and associates the image corresponding to the shortest distance as a reverse image of the card whose obverse image 700 has been extracted. In the case shown in FIG. 7C, because the latter distance is shorter than the former distance, the CPU 111 associates the obverse image 700 with the reverse image 706 as an obverse and reverse image pair of one card.

In step S309, the CPU 111 performs obverse and reverse pair association with respect to all the obverse images extracted in step S304 by repeating the method described with reference to FIGS. 7A to 7C. It should be noted that the method for performing obverse and reverse pair association based on position information is not limited to the above method. For example, the above determination may be performed by determining whether the central coordinates of a reverse image exist inside a circular area centered on central coordinates and having a predetermined radius other than sqrt $\{(X/2)^2+(Y/2)^2\}$ described above.

In step S310, the CPU 111 determines whether the obverse and reverse pairs of all the cards are associated in step S309. If the obverse and reverse pairs of all the cards are associated, the CPU 111 determines that the associating operation has succeeded, and the process advances to step S314. If there is at least one card whose obverse and reverse images are not associated, the CPU 111 determines that the associating operation has failed, and the process advances to step S311.

An example of determining whether the associating operation has succeeded or failed will be described with reference to FIGS. 5A to 5C. Assume that after cards are arranged as shown in FIG. 5B, the reverse images of the respective cards are scanned. In this case, the reverse images 511 to 515 of the respective cards are properly associated with the obverse images 501 to 505 of the cards. Accordingly, the CPU 111 determines in step S310 that obverse and reverse pair association has succeeded, and the process advances to step S314. That is, when the positions of cards at the time of scanning the reverse surfaces of the respective cards do not much differ from the positions of the cards at the time of obverse surface scanning, the CPU 111 can quickly associate an obverse and reverse pair. In contrast to this, assume that after cards are arranged as shown in FIG. 5C, the reverse images of the respective cards are scanned. In this case, the CPU 111 does not determine that the obverse image of the card disposed at the upper left end and the reverse image are associated as an obverse and reverse pair. Accordingly, the CPU 111 determines in step S310 that obverse and reverse pair association has failed, and the process advances to step S311. In addition, when the position of a given card at the time of scanning the reverse surface of the card greatly differs from the position of the card at the time of scanning the obverse surface, it is possible to reduce the user operation burden in image selection by estimating a combination of obverse and reverse images using feature amounts to be described later. In addition, this can prevent the reverse image 521 and the obverse image 502 from being erroneously associated as the obverse and reverse pair of one card. In the above determining whether the associating operation has succeeded or failed, however, the CPU 111 cannot determine the case where the positions of cards are simply interchanged. Referring to FIG. 5B, assume that the position of one card from which the reverse image 511 is extracted is located on the upper left end where the obverse image of another card is extracted, while the position of the another card from which the reverse image 512 is extracted is located at the upper middle position where the obverse image of the one card is extracted. In this case, a card obverse and reverse pair checking unit used in step S314 to be described later displays an obverse and reverse pair as a result of association. This allows the user to check whether the association result is proper.

Figure 8:
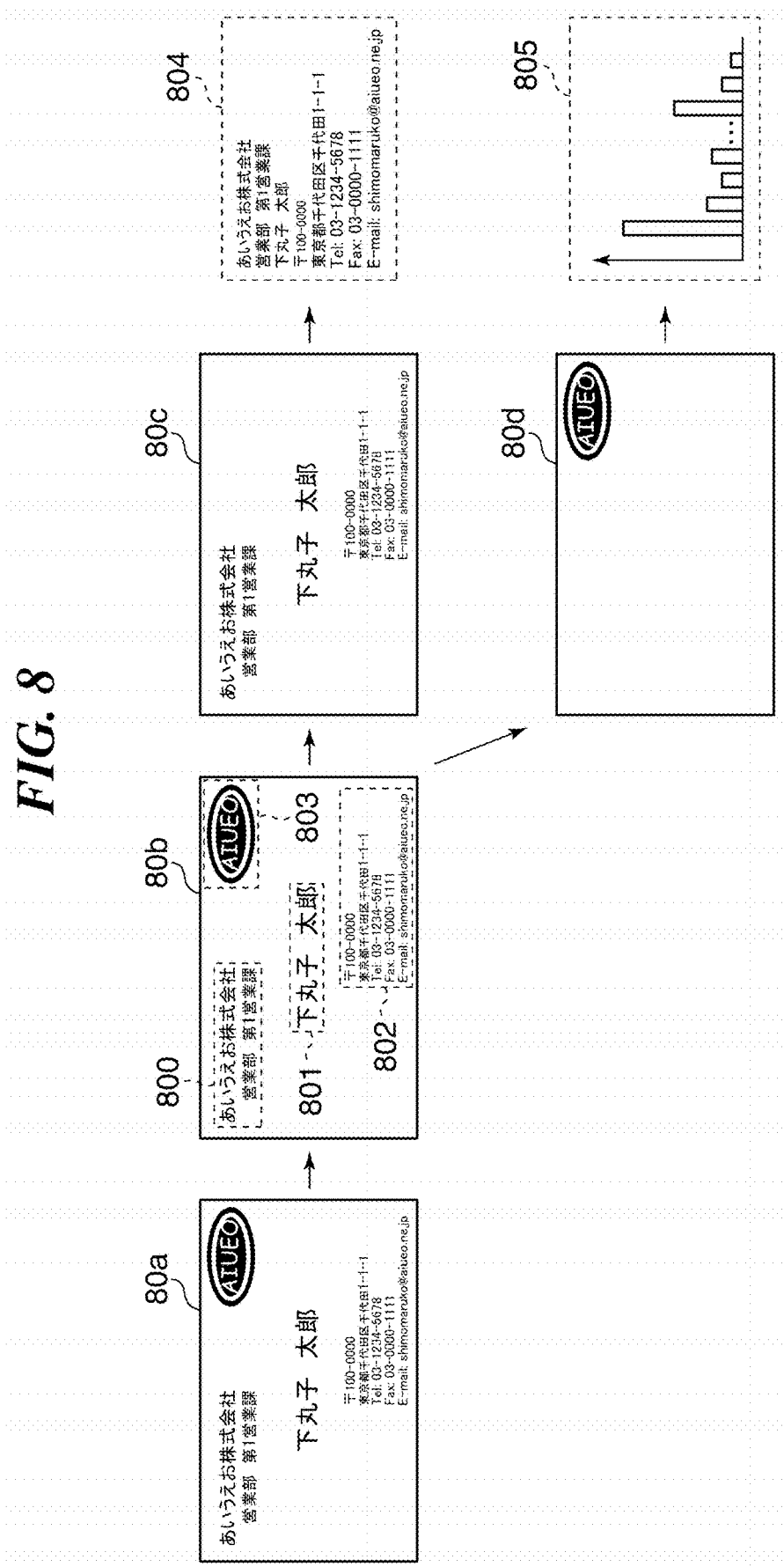
FIG. 8 is a view for explaining a method for extracting feature amounts from a card, which is executed in a step in FIG. 3.

In step S311, the CPU 111 extracts feature amounts from the obverse image of each card extracted in step S304 and the reverse image of each card extracted in step S307. FIG. 8 shows a procedure for extracting a feature amount from an image 80a as one of the images extracted in steps S304 and S307.

First of all, block selection processing is executed for the image 80a as shown in FIG. 8. Block selection processing is the determination processing of classifying images into foreground images and background images and then dividing the foreground images into character portions and remaining portions. An image 80b is the result of performing block selection processing for the image 80a. Of the areas classified as the foreground images, areas 800 to 802 are character portions, and an area 803 is a portion other than characters. An image 80c is the result of removing portions other than the areas 800 to 802 determined to be the character portions by block selection processing. The CPU 111 performs OCR processing for the image 80c to extract character string information 804 as a character feature amount. An image 80d is the result of removing portions other than the area 803 determined to be the portion other than the character portions by block selection processing. The CPU 111 extracts a histogram 805 of a high-order local autocorrelation feature as an image feature amount from the image 80d. A high-order local autocorrelation feature is a statistical feature amount satisfying a location invariance property and an additive property. When processing a card like a name card having identical logos printed on its obverse and reverse surfaces, this technique can estimate an obverse and reverse pair on the basis of a high-order local autocorrelation feature.

It should be noted that a feature amount to be extracted in step S311 is not limited to the above feature amounts as long as it indicates the commonality between the obverse and reverse images of a card. For example, the CPU 111 may use either a local feature amount used for image recognition or a color histogram.

In step S312, the CPU 111 calculates the degrees of matching between the feature amounts extracted in step S311 with respect to all the combinations of the obverse images extracted in step S304 and the reverse images extracted in step S307. In the present embodiment, the CPU 111 separately calculates the degrees of matching with respect to extracted character feature amounts and image feature amounts.

A method for calculating the degrees of matching between character feature amounts will be described first. When calculating the degree of matching between character feature amounts, the CPU 111 uses the number of matching lines between an obverse image and a reverse image. This is because a name card or the like often has information for discrimination from other cards, such as a telephone number or mail address, written in one character string. In order to calculate the number of matching lines, the CPU 111 uses matching using Dynamic Programming (to be referred to as a "DP matching" hereinafter) between character strings divided on a line basis. The DP matching is a technique used for a similar character string search, and is a matching method using a point deduction scoring system in consideration of the alignment sequence of character strings. If the matching score of a given combination of character strings, which is obtained by DP matching, indicates a value equal to or more than a predetermined threshold, the CPU 111 determines that the character strings match each other, and counts them as one matching line. It should be noted that a method for calculating the degree of matching between character feature amounts is not limited to the above method. The CPU 111 may use Hidden Marcov Model (HMM), Boyer-Moore (BM) method, or Levenshtein distance for matching between character strings for the determination of the number of matching lines. When calculating the degree of matching between character string feature amounts, the CPU 111 may use the number of matching between character strings having specific attributes such as a telephone number and a mail address, which are extracted according to regular expressions, instead of the number of matching lines.

A method for calculating the degrees of matching between image feature amounts will be described next. When calculating the degrees of matching between image feature amounts, the CPU 111 uses the correlations between image feature amounts which are obtained by using Histogram Intersection. It should be noted that a method for calculating the degrees of matching between image feature amounts is not limited to Histogram Intersection, but Euclidean distance or Bhattacharyya distance, or the like may be used.

In step S313, the CPU 111 tentatively decides obverse and reverse pairs by estimating them on the basis of the degrees of matching between feature amounts, which are calculated in step S312. In step S312, the CPU 111 calculates the degrees of matching between character feature amounts and image feature amounts to estimate combinations of obverse and reverse surfaces with respect to all the obverse images extracted in step S304 and all the reverse images extracted in step S307. More specifically, first of all, the CPU 111 tentatively decides obverse and reverse pairs by sequentially arranging the degrees of matching between character feature amounts in descending order. If there is a plurality of images whose degrees of matching between character feature amounts are close to each other, the CPU 111 tentatively decides obverse and reverse pairs by arranging the degrees of matching between image feature amounts in descending order. With regard to the remaining cards corresponding to both the degrees of matching between character feature amounts and between image feature amounts which are lower than predetermined thresholds, the CPU 111 tentatively decides, as obverse and reverse pairs, obverse and reverse images determined to be located near positions on the basis of the central coordinates of the respective cards acquired in steps S305 and S308.

In step S314, the CPU 111 (display control unit) displays the obverse and reverse pairs extracted in steps S304 and S307 on the display/operation unit 121 (display screen). Subsequently, the CPU 111 accepts a user's instruction to check obverse and reverse pairs, that is, to check whether the obverse and reverse pairs are proper. The obverse and reverse pairs to be displayed in this case include obverse and reverse pairs associated in step S309 or obverse and reverse pairs estimated in step S313.

A method for checking card obverse and reverse pairs in step S314 will be described with reference to FIGS. 9 and 10. Explanation of a card obverse and reverse pair checking screen will be described first with reference to FIG. 9.

The display/operation unit 121 according to the present embodiment has on its surface a card obverse and reverse pair checking screen 901, which is a UI screen having a display/operation function, and hard buttons 902.

The card obverse and reverse pair checking screen 901 displays obverse images 903 to 906 and corresponding reverse images 907 to 910 (to be simply referred to as the images 903 to 910 hereinafter). The obverse and reverse pairs associated in step S309 or the obverse and reverse pairs estimated in step S313 are displayed vertically side by side. It should be noted that an image pair, of obverse and reverse pairs estimated in step S313, which exhibits a degree of matching between feature amounts lower than a predetermined value is highlighted by, for example, changing the color of the frame of the image pair. This allows the user to preferentially check whether this pair is the obverse and reverse pair of one card. In addition, with regard to cards that have not been associated as obverse and reverse pairs, the corresponding obverse images or reverse images are not displayed.

Buttons 911 and 912 are buttons for accepting user's instructions to switch obverse and reverse pairs, displayed as the images 903 to 910, to be checked to other images. If there are a large quantity of card images clipped and sorted in steps S304 and S307, displaying all the obverse and reverse pairs will reduce visibility. For this reason, in the present embodiment, the card obverse and reverse pair checking screen 901 displays some of the images extracted in steps S304 and S307. In addition, in accordance with user's instructions accepted by the buttons 911 and 912, the CPU 111 switches the images to be displayed on the card obverse and reverse pair checking screen 901 to other images extracted in steps S304 and S307. It should be noted that the display order of obverse and reverse image pairs of the images 903 to 910 may be decided on the basis of the positions of the central coordinates acquired in steps S305 and S308, or may be decided by using the degrees of matching between feature amounts calculated in step S312. When displaying the obverse and reverse pairs estimated in step S313, in particular, the CPU 111 arranges the images in ascending order of the degrees of matching between feature amounts. This enables the user to preferentially check pairs with high error probabilities.

Buttons 913 to 916 are buttons for accepting instructions to change obverse and reverse image pairs to be displayed as the images 903 to 910. If, for example, the button 913 accepts an instruction to change the obverse and reverse image pair to be displayed as the images 903 and 907, the CPU 111 makes a transition to a screen for selecting a reverse image corresponding to the obverse image 903. This reverse image selection screen will be described later with reference to FIG. 10.

A button 917 is a button for accepting an instruction to decide an obverse and reverse pair in accordance with the contents of the card obverse and reverse pair checking screen 901 as a UI screen. When the user issues an instruction to decide an obverse and reverse pair with the button 917, the CPU 111 decides an obverse and reverse pair with respect to each card or decides that the card is a single-sided printed card, in accordance with the contents of the card obverse and reverse pair checking screen 901 as a UI screen. The process then advances to step S315 or S316.

Figure 10:
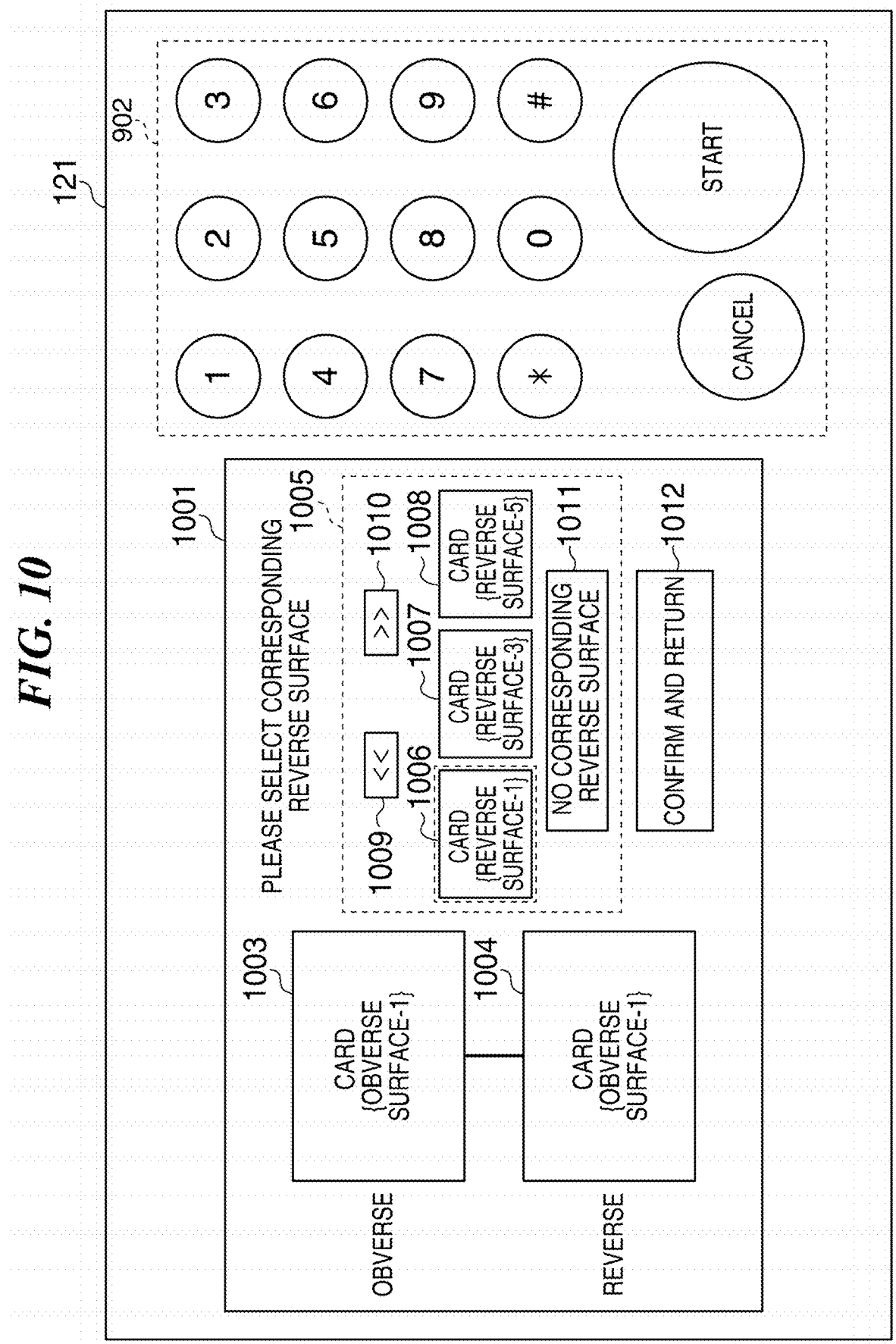
FIG. 10 is a view showing a screen to be displayed at the time of selection of a reverse card, which is executed in a step in FIG. 3.

FIG. 10 shows a selection screen 1001 for selecting a reverse image to be paired with a displayed obverse image in step S314. The selection screen 1001 is displayed when any one of the buttons 913 to 916 on the card obverse and reverse pair checking screen 901 accepts an instruction to change the obverse and reverse pair of a card.

Figure 9:
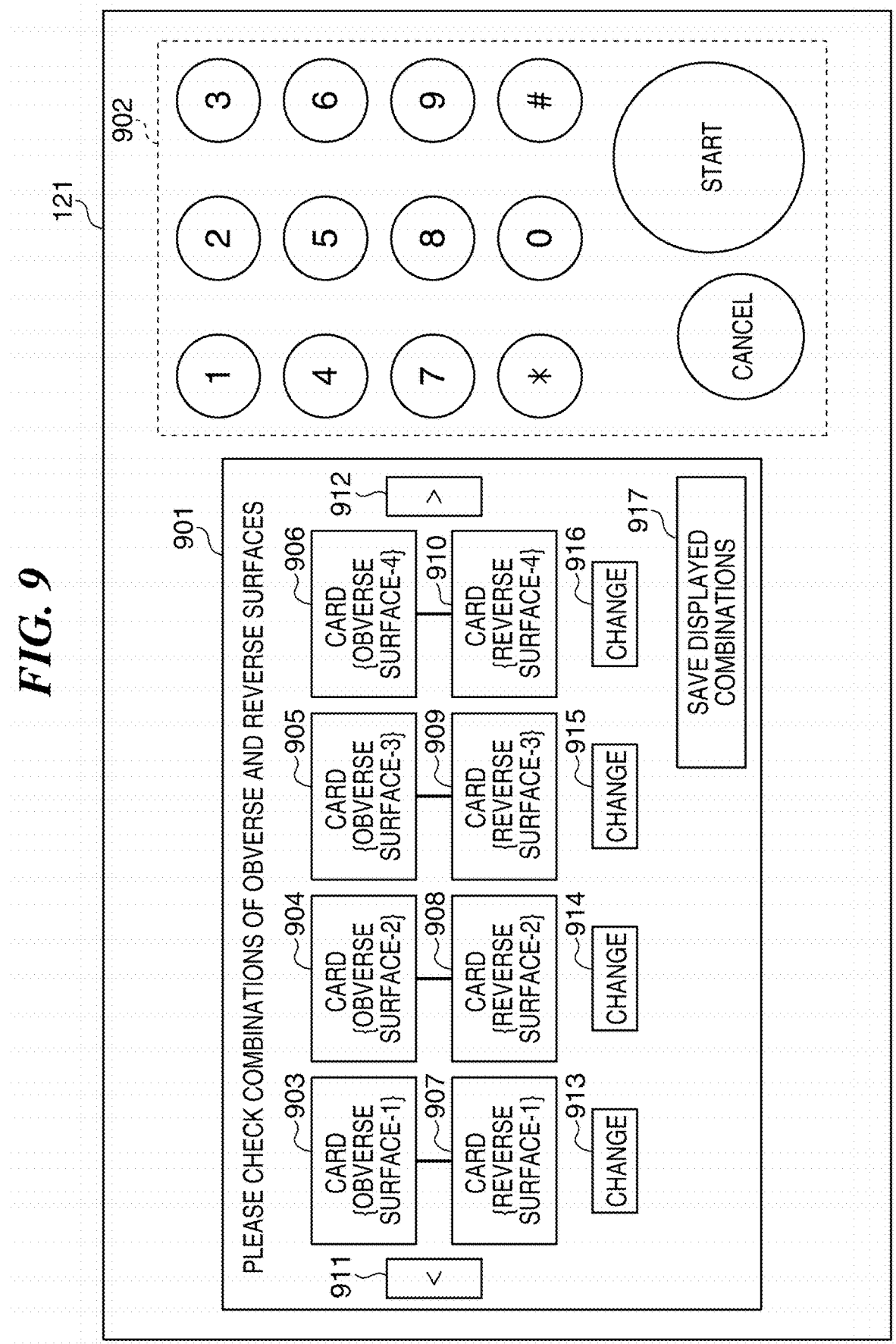
FIG. 9 is a view showing a screen to be displayed at the time of checking card obverse and reverse pairs, which is executed in a step in FIG. 3.

The selection screen 1001 displayed on the display/operation unit 121 is a UI screen having a display/operation function like the card obverse and reverse pair checking screen 901 in FIG. 9.

An image 1003 is an obverse image of one card. An obverse image, of the obverse images 903 to 906 displayed on the card obverse and reverse pair checking screen 901, which corresponds to a selected one of the buttons 913 to 916 is displayed as the image 1003 on the selection screen 1001.

An image 1004 is a reverse image corresponding to the obverse image 1003. A reverse image, of the reverse images 907 to 910 displayed on the card obverse and reverse pair checking screen 901, which corresponds to a selected one of the buttons 913 to 916 is displayed as the image 1004 on the selection screen 1001.

A reverse image selection portion 1005 serves to cause the user to select a reverse image corresponding to the obverse image 1003.

As reverse images 1006 to 1008, a few or all of the reverse images extracted in step S307 are displayed. It should be noted that the reverse image selection portion 1005 not only displays reverse images but also accepts one of the reverse images 1006 to 1008 as a reverse image of an obverse and reverse pair on the basis of a user's instruction. More specifically, when the user designates one of the reverse images 1006 to 1008, the CPU 111 switches the designated reverse image with the reverse image 1004 and displays it.

Buttons 1009 and 1010 are buttons for accepting instructions to switch the reverse images 1006 to 1008 displayed on the reverse image selection portion 1005. If there are a large quantity of reverse images extracted in step S307, displaying all the extracted reverse images on the reverse image selection portion 1005 will reduce visibility. For this reason, a few images of the extracted reverse images are displayed. In the present embodiment, upon determining in step S310 that the obverse and reverse pair of all the cards are associated with each other, the CPU 111 arranges and displays the obverse and reverse images as obverse and reverse pairs in the order in which the central coordinate values extracted in step S308 are close to each other. In addition, upon determining in step S310 that obverse and reverse pair association has failed, the CPU 111 displays reverse images in the order decided on the basis of the degrees of matching between feature amounts calculated in step S312. The display order of reverse images based on the degrees of matching between feature amounts is decided by the following method. First of all, the images are arranged in descending order of the degrees of matching between character feature amounts. The reverse images whose degrees of matching between character features are lower than a predetermined threshold are arrange in descending order of the degrees of matching between image feature amounts. In this case, there is no need to display reverse images that have been confirmed as those paired with other obverse images. It should be noted that a method for deciding the display order of reverse images to be displayed on the reverse image selection portion 1005 is not limited to the above method. A display order may be decided by setting weights for the respective character feature amounts and image feature amounts or may be decided by using either character feature amounts or image feature amounts.

A button 1011 is a button for accepting, for the user, an instruction to indicate that there is no reverse image corresponding to the obverse image 1003. Upon accepting the instruction to indicate that there is no reverse card corresponding to the obverse image 1003 via the button 1011, the CPU 111 displays information indicating that there is no corresponding reverse image, without displaying any image as the reverse image 1004.

A button 1012 is a button for accepting an instruction to confirm a reverse image corresponding to the obverse image 1003. Upon accepting the instruction to confirm a reverse image corresponding to the obverse image 1003 via the button 1012, the CPU 111 displays the obverse image 1003 and the reverse image 1004. Subsequently, upon deciding whether the card from which the obverse image 1003 has been extracted is a double-sided printed card, the CPU 111 makes a return to the card obverse and reverse pair checking screen 901 shown in FIG. 9. When a reverse image is selected, the CPU 111 decides the obverse image 1003 and the reverse image 1004 as an obverse and reverse pair. Upon accepting the instruction to indicate that there is no reverse card via the button 1011, the CPU 111 decides the card from which the obverse image 1003 has been extracted as a single-sided printed card, because there is no reverse image to be paired with the obverse image 1003.

As described above, in step S314, the CPU 111 displays the obverse and reverse pair of a card associated in step S309 or the obverse and reverse pair of a card estimated in step S313, and prompts the user to check the obverse and reverse pair. With this operation, as shown in FIG. 5B, if the position of a card does not much shift when the user turns the card upside down, the user is only required to check a reverse card corresponding to an obverse card. In addition, as shown in FIG. 5C, even if there is a card that has greatly shifted when it was turned upside down, presenting an estimated obverse and reverse pair makes it unnecessary for the user to select obverse and reverse pairs one by one again. Furthermore, because candidates can be displayed by using the feature amounts and position information of cards, the user can easily correct obverse and reverse pair association even if estimated obverse and reverse pairs are wrong.

<Detailed Description of Data Generation Processing 302>

Finally, the data generation processing 302 in FIG. 3 will be described.

In step S315, the CPU 111 generates combined data of the obverse and reverse image pair of the card from the images extracted in steps S304 and S307. This makes it possible to form the obverse and reverse images decided as the obverse and reverse pair in step S314 into the same file. In the present embodiment, the file generated in step S315 is a portable document format (PDF) file. Adopting such a file format makes it possible to save images while sorting them according to pages, and hence the obverse and reverse images of one card are saved upon being sorted to two pages. For example, when the obverse image 501 and the reverse image 511 shown in FIG. 5 are decided as an obverse and reverse pair in step S314, the CPU 111 saves the obverse image 501 at the first page in a PDF file, and saves the reverse image 511 at the second page. This makes it possible to sort the obverse image and the reverse image to two pages and save them in one file as multipage information. In addition, such an obverse and reverse image pair may be saved in a file other than a PDF file as long as they can be saved as one file. In addition, when there is no need to combine an obverse and reverse image pair, the respective images may be handled as separate images as long as the obverse and reverse images can be associated with each other.

In step S316, the CPU 111 generates a one-page file when a card clipped and sorted in steps S304 or S307 is a single-sided printed card having only an obverse image or reverse image. This makes it possible to form a card obverse surface (or card reverse surface) into a file. A method for generating such a file including one page is used when the CPU 111 decides in step S314 that the card is a single-sided printed card.

In step S317, the CPU 111 saves the files generated in steps S315 and S316. Such files may be saved in the HDD 119 in the image processing apparatus 100 or may be saved in the HDD in the PC 101 or the mobile terminal 103 via the LAN 104. The CPU 111 can read out such a file from the HDD in the PC 101 or mobile terminal 103 and use it through OCR processing or application.

The above operation is executed in the data generation processing 302.

As described above, according to the present embodiment, obverse and reverse pair association is performed with respect to the images of the respective cards by the method shown in FIGS. 7A to 7C. With this operation, if the position of a card does not change much when being turned upside down, the CPU 111 calculates no feature amounts and no degrees of matching between feature amounts, and hence can quickly perform obverse and reverse pair association and prompt the user to check the association. In addition, if an obverse and reverse pair cannot be associated with each other by the method shown in FIGS. 7A to 7C, the CPU 111 calculates feature amounts and estimates an obverse and reverse pair on the basis of the degrees of matching between the feature amounts and presented to the user. This makes it unnecessary for the user to issue an instruction for an obverse and reverse pair image by image. Furthermore, because the display order of reverse images can be changed on the reverse image selection portion 1005 on the basis of the degrees of matching between the feature amounts, obverse and reverse pairs can be easily corrected.

Second Embodiment

According to the first embodiment, when the position of an image of each card has not changed much when the card was turned upside down, an obverse and reverse pair is associated with each other by the method shown in FIGS. 7A to 7C. If an obverse and reverse pair cannot be associated with each other by the method shown in FIGS. 7A to 7C, an obverse and reverse pair is associated with each other by using feature amounts. Thereafter, the user is required to check the associated obverse and reverse pair.

That is, the first embodiment is based on the premise that the number of obverse images is equal to that of reverse images, and hence association determination is performed depending on whether the obverse and reverse pairs of all the cards are associated with each other. In practice, however, there may be a case in which the number of obverse images does not match the number of reverse images. For example, when there are both double-sided printed cards and single-sided printed cards on the platen, the user sometimes removes the single-sided printed cards from the platen without turning them upside down. In addition, when a plurality of cards is stacked on each other upon being turned upside down, reverse surfaces of the cards are extracted as a reverse surface of one card, resulting in mismatching between the numbers of obverse and reverse cards.

The second embodiment is configured to perform processing for determination of association in consideration of whether or not the number of extracted obverse surfaces differs from that of extracted reverse images instead of the processing in step S310 in FIG. 3. This processing will be described in detail with reference to FIGS. 11, 12A, 12B, and 12C. It should be noted that only portions different from the first embodiment will be described below.

The CPU 111 determines in step S310 whether obverse and reverse pair association has succeeded or failed. Determination of obverse and reverse pair association is performed by using the numbers of obverse and reverse images extracted in steps S304 and S307 and the result of whether the respective cards are associated as obverse and reverse pairs in step S309.

Determination of obverse and reverse pair association will be described with reference to FIG. 11. Conditions 1100 to 1102 are conditions based on the numbers of obverse and reverse images extracted in steps S304 and S307. Items 1103 to 1106 are items indicating the surfaces of cards, which are used for determination of obverse and reverse pair association, with "◯" being written in each item column. If all the cards corresponding to the items 1103 to 1106 are associated as obverse and reverse pairs in step S309 under each condition, the CPU 111 determines in step S310 that the associating operation has succeeded. If at least one of the cards corresponding to the items 1103 to 1106 has failed in obverse and reverse pair association in step S309, the CPU 111 determines in step S310 that the associating operation has failed. That is, assuming that N obverse images are extracted in step S304 and M (<N) reverse images are extracted in step S307 (that is, under the condition 1101), if it is discriminated that there are M combinations of rectangular images as the above obverse and reverse pairs, the CPU 111 determines that the associating operation has succeeded. Much the same is true on a case in which the relation between the number of extracted obverse images and the number of extracted reverse images is reverse to that described above (that is, under the condition 1102).

If the number of obverse images is equal to that of reverse images as indicated by the condition 1100, the CPU 111 checks whether all the obverse and reverse images are associated as obverse and reverse pairs in step S309.

Figure 12A:
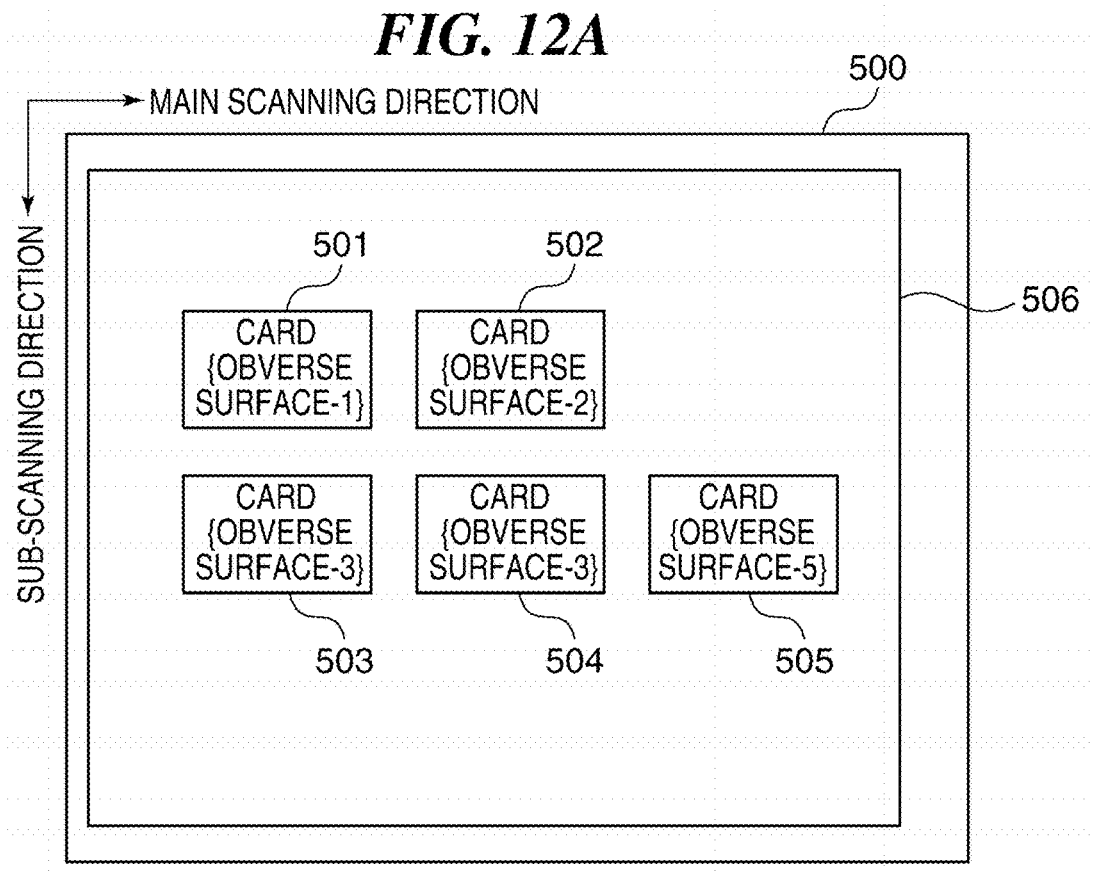
FIGS. 12A to 12C are views each showing an example of the arrangement of cards indicated by a corresponding one of the conditions shown in FIG. 11 at the time of reading cards.

The conditions 1101 and 1102 will be described with reference to FIGS. 12A to 12C. Like FIG. 5A, FIG. 12A shows a case in which five cards are arranged on the platen of the scanner unit 120. In addition, FIGS. 12B and 12C each shows an example of the arrangement of cards at the time of reverse surface scanning.

Figure 12B:
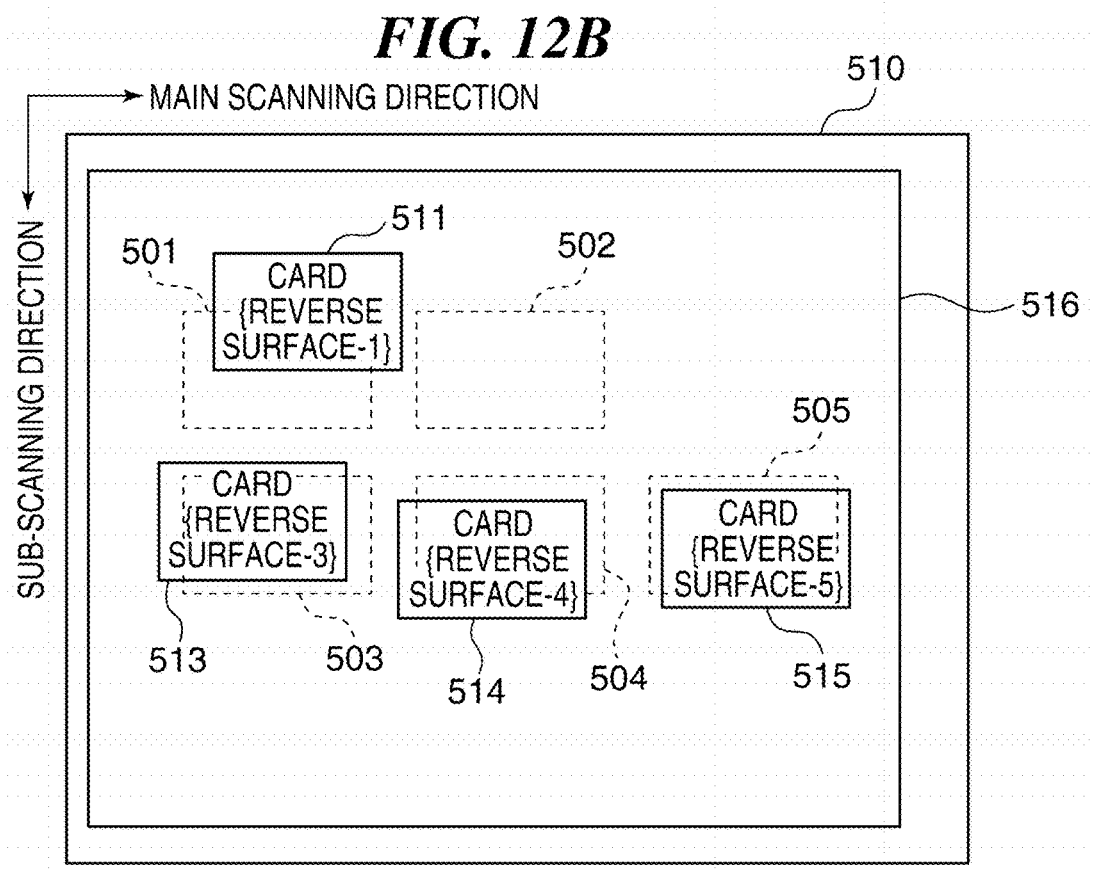

FIG. 12B shows a case under the condition 1101, that is, a case in which the number of obverse images is larger than the number of reverse images. Like FIG. 5B, FIG. 12B shows an example of the arrangement of cards at the time of reverse surface scanning. However, FIG. 12B shows a case in which a card disposed at an upper middle position at the time obverse surface scanning, with an obverse image 502 being extracted, is removed at the time of reverse surface scanning. In this case, in step S309, the CPU 111 associates obverse images 501, 503, 504, and 505 with reverse images 511, 513, 514, and 515 as obverse and reverse pairs. Although no reverse image corresponding to the obverse image 502 is found, because obverse cards corresponding to all the reverse images have been found, the CPU 111 determines that obverse and reverse association has succeeded. The process then advances to step S314.

Figure 12C:
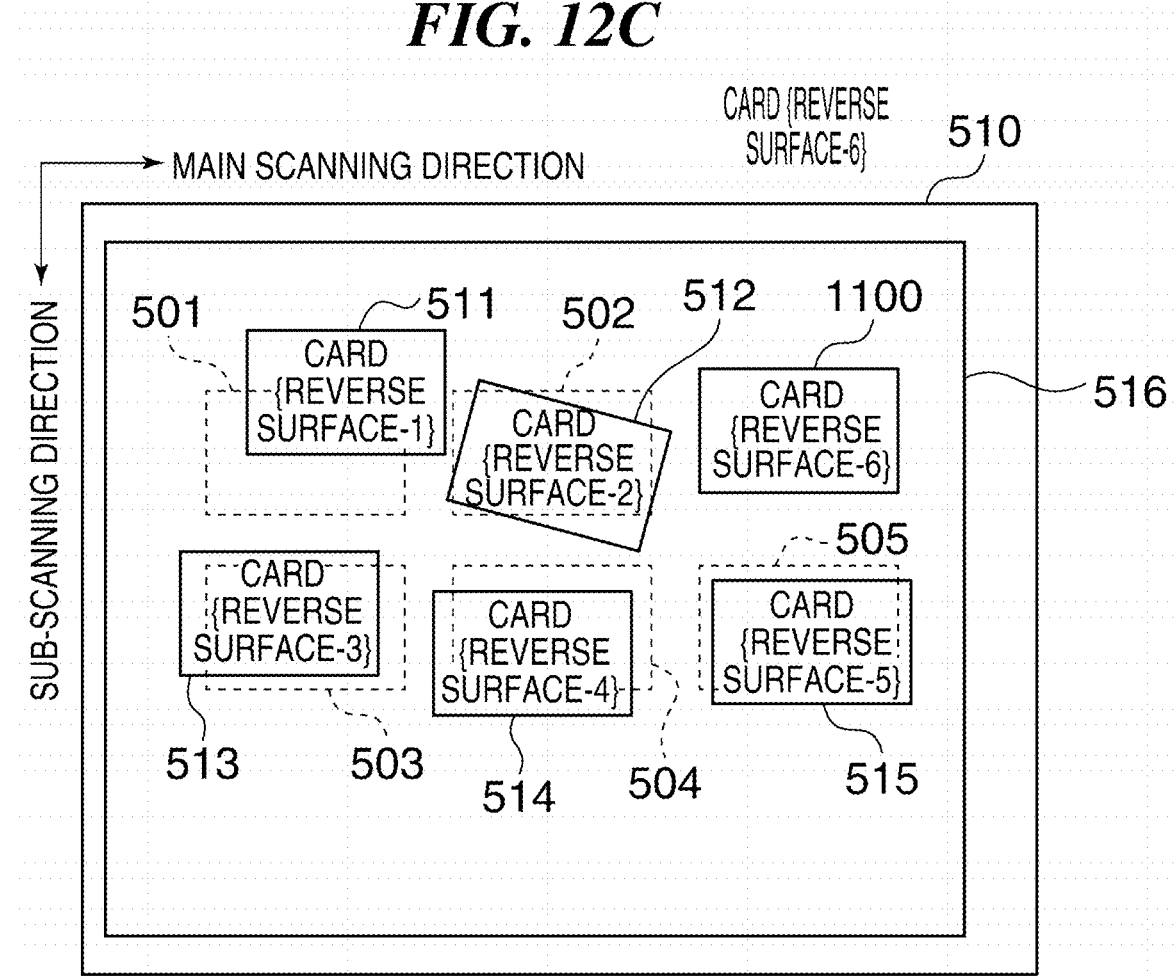

FIG. 12C shows a case under the condition 1102, that is, a case in which the number of obverse cards is smaller than that of reverse cards. Like FIG. 5B, FIG. 12C shows an example of the arrangement of cards at the time of reverse surface scanning. However, FIG. 12C shows the arrangement of cards, with one card having an image 1100 being added at the time of reverse surface scanning after the completion of scanning of the obverse surfaces. In this case, in step S309, the CPU 111 associates the obverse images 501 to 505 with the reverse images 511 to 515 as obverse and reverse pairs. Although no obverse image corresponding to the reverse image 1100 is found, because reverse images corresponding to all the obverse images have been found, the CPU 111 determines that obverse and reverse association has succeeded. The process then advances to step S314.

As described above, according to the present embodiment, when obverse and reverse pair association is determined, it is possible to selectively use position information or feature amounts for the association of the obverse and reverse pairs of cards in accordance with the number of obverse images and the number of reverse images. Even if the number of obverse images does not match the number of reverse images, it is possible to accurately associate obverse and reverse images with each other and prompt the user to check the association.

Third Embodiment

The first embodiment has exemplified the method for acquiring images by using the scanner at the time of reading the two surfaces of each card.

In addition to the acquisition of images by the scanner, camera images are sometimes input by using, for example, a camera device provided for a tablet terminal 103.

Figure 13:
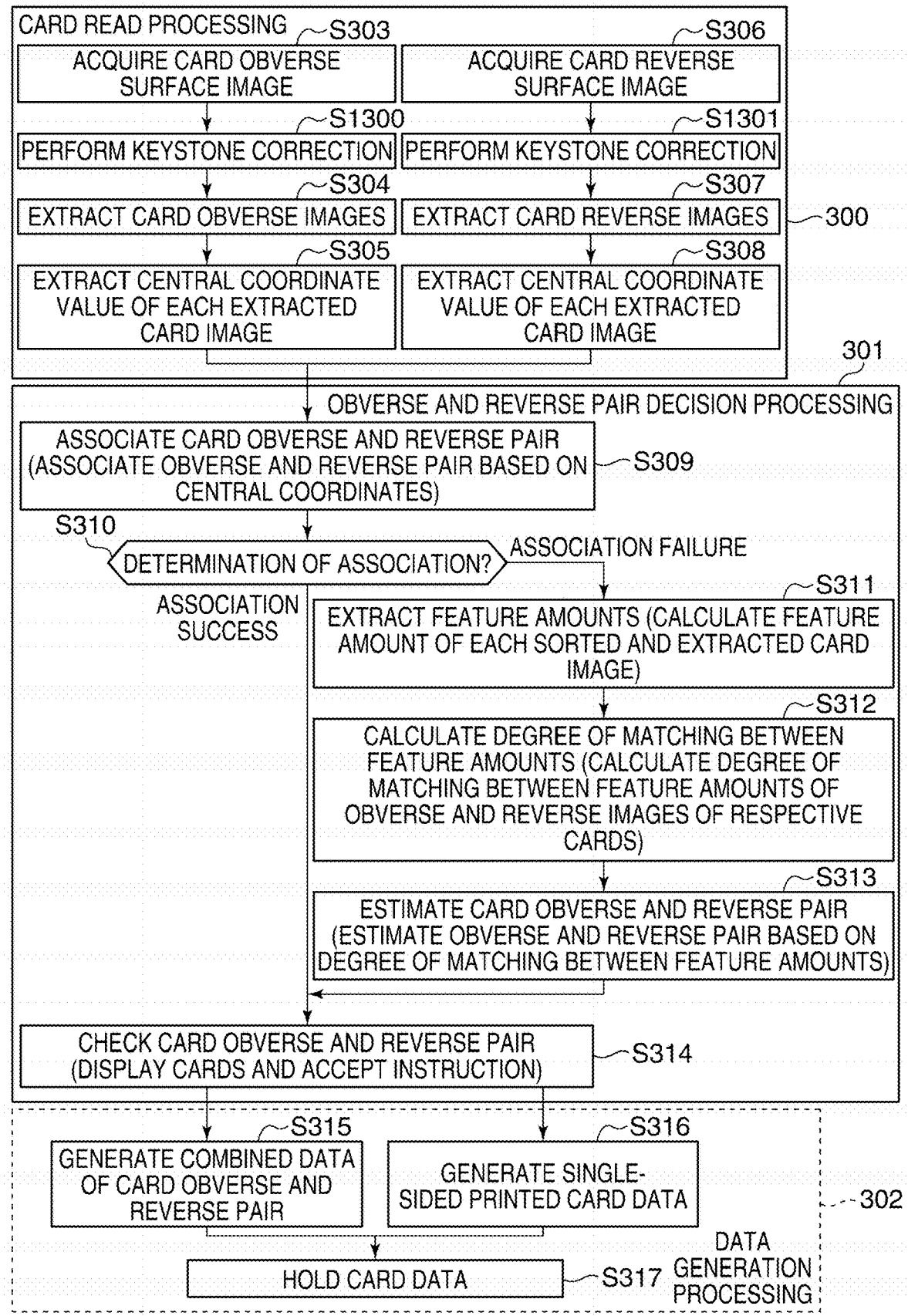
FIG. 13 is a flowchart showing an image processing procedure according to the third embodiment of the present invention.

An arrangement for a case in which images are acquired by a camera device instead of a scanner will be described below with reference to FIG. 13. Referring to FIG. 13, in addition to the steps in FIG. 3, steps S1300 and S1301 for keystone correction are respectively provided between step S303 for image acquisition and step S304 for card image extraction and between step S306 for image acquisition and step S307 for card image extraction. In step S303 for image acquisition using the camera device, the user arranges a plurality of cards and acquires their images. When acquiring camera images, the camera device sometimes acquires images obliquely relative to a document as is distinct from the scanner. For this reason, in step S1300, keystone correction is performed for each image acquired in step S303.

The following keystone correction method can be used. First of all, the frame edges of a plurality of cards are obtained. A homography matrix used for keystone correction is calculated from each of the frame edges. Homography transformation (projection transformation) is then performed with respect to the each camera image. It should be noted that a keystone correction method can be implemented by a known technique.

Keystone correction is performed in step S1300 with respect to the images acquired in step S303, and image extraction processing is performed in step S304. Similarly, keystone correction is performed in step S1301 with respect to the images acquired in step S306, and then image extraction processing is performed in step S307.

It should be noted that the flowchart shown in FIG. 13 may be executed by, for example, the CPU in a mobile terminal 103. Alternatively, steps S303 and S306 for image acquisition may be performed inside the mobile terminal 103, and the subsequent processing may be performed by an image processing apparatus 100 or a PC 101.

As described above, as in the present embodiment, adding a keystone correction unit arrangement for performing keystone correction with respect to input images makes it possible to implement decision of obverse and reverse pairs of a plurality of cards for not only images from a scanner but also images from a camera device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-243631, filed Dec. 15, 2016 which is hereby incorporated by reference herein in its entirety.

What is claimed is:

1. An image processing apparatus comprising:
at least one processor that:
acquires a first image and a second image;
extracts a plurality of first rectangular images from the first image and a first position coordinate from each of the plurality of first rectangular images;
extracts a plurality of second rectangular images from the second image and a second position coordinate from each of the plurality of second rectangular images;
makes, based on the first and second position coordinates extracted from each of the plurality of first and second rectangular images, a first decision deciding that one of the first rectangular images and one of the second rectangular images whose positions are within a predetermined distance are an obverse and reverse pair; and makes, based on feature amounts extracted from the first and second rectangular images in accordance with the result of the first decision, a second decision deciding that one of the first rectangular images and one of the second rectangular images whose matching degree of the feature amounts extracted therefrom is greater than or equal to a predetermined value are an obverse and reverse pair.

2. The image processing apparatus according to claim 1, wherein the at least one processor further saves, in association with each other, one of the first rectangular images and one of the second rectangular images which are decided to be the obverse and reverse pair by either one of the first decision and the second decision.

3. The image processing apparatus according to claim 1, wherein the at least one processor further displays pairs of images among the first rectangular images and counterpart images thereof among the second rectangular images which are decided to be the obverse and reverse pairs by either one of the first decision and the second decision on a display screen in association with each other.

4. The image processing apparatus according to claim 3, wherein association of the pairs which are displayed on the display screen can be changed by user operation.

5. The image processing apparatus according to claim 4, wherein when the association is to be changed, the more likely an image among the second rectangular images is to be the obverse and reverse pair of the displayed one of the first rectangular images, the higher the priority for displaying on the display screen the image is given as a change target.

6. The image processing apparatus according to claim 5, wherein the image among the second rectangular images that is more likely to be the obverse and reverse pair of the displayed one of the first rectangular images is an image the second position coordinate extracted from which is closer to the first position coordinate extracted from the displayed one of the first rectangular images or matching degree of the feature amounts extracted from which and the displayed one of the first rectangular images is greater than or equal to a predetermined value.

7. The image processing apparatus according to claim 3, wherein the at least one processor further displays, among pairs of the images and the counterpart images thereof which are displayed on the display screen in association with each other as the obverse and reverse pairs, a pair, which is less likely to be the obverse and reverse pair, differently from other pairs.

8. The image processing apparatus according to claim 3, wherein the at least one processor further displays, among pairs of the images and the counterpart images thereof which are displayed on the display screen in association with each other as the obverse and reverse pairs, a pair, which is less likely to be the obverse and reverse pair, with priority over other pairs.

9. The image processing apparatus according to claim 3, wherein the at least one processor further decides a display order of the pairs of the images and the counterpart images thereof, which are displayed on the display screen in association with each other as the obverse and reverse pairs, on the basis of the first and second position coordinates and the feature amounts of each of the pairs.

10. The image processing apparatus according to claim 1, wherein one of the first rectangular images and one of the second rectangular images have positions within the predetermined distance in a case where a central coordinate value of the one of the first rectangular images and a central coordinate value of the one of the second rectangular images are within the predetermined distance.

11. The image processing apparatus according to claim 10, wherein the at least the one processor further decides that, in a case where central coordinate values of at least two of the second rectangular images are located within the predetermined distance from a central coordinate value of one of the first rectangular images, an image among the at least two of the second rectangular images which central coordinate value is located closest to the central coordinate value of the one of the first rectangular images is an obverse and reverse pair of the one of the first rectangular images.

12. The image processing apparatus according to claim 1, wherein the at least one processor further ends the first decision and the second decision, when N images are extracted as the first rectangular images and M (<N) images are extracted as the second rectangular images, and if M obverse and reverse pairs are decided by either one of the first decision and the second decision.

13. The image processing apparatus according to claim 1, wherein when making the second decision, the feature amounts are character strings contained in the first and second rectangular images.

14. The image processing apparatus according to claim 1, wherein when making the second decision, the feature amounts are image feature amounts contained in the first and second rectangular images.

15. The image processing apparatus according to claim 1, wherein keystone correction is performed for the first and second images before extracting the first and second rectangular images.

16. The image processing apparatus according to claim 1, wherein the first and second images are images scanned from a plurality of documents, and the first rectangular images are images scanned from obverse surfaces of the plurality of documents while the second images are images scanned from reverse surfaces of the plurality of documents.

17. The image processing apparatus according to claim 1, wherein the second decision is made for images among the first and second rectangular images that are not decided to be an obverse and reverse pair by the first decision.

18. A control method for an image processing apparatus, the method comprising:
acquiring a first image and a second image;
extracting a plurality of first rectangular images from the first image and a first position coordinate from each of the plurality of first rectangular images;
extracting a plurality of second rectangular images from the second image and a second position coordinate from each of the plurality of second rectangular images;
making, based on the first and second position coordinates extracted from each of the first and second rectangular images, a first decision deciding that one of the first rectangular images and one of the second rectangular images whose positions are within a predetermined distance are an obverse and reverse pair; and
making, based on feature amounts extracted from the first and second rectangular images in accordance with the result of the first decision, a second decision deciding that one of the first rectangular images and one of the second rectangular images whose matching degree of the feature amounts extracted therefrom is greater than or equal to a predetermined value are an obverse and reverse pair.

19. A non-transitory computer-readable storage medium storing a computer-executable program for executing a method of controlling an image processing apparatus,
wherein the method comprises:
acquiring a first image and a second image;
extracting a plurality of first rectangular images and a first position coordinate from each of the plurality of first rectangular images;
extracting a plurality of second rectangular images and a second position coordinate from each of the plurality of second rectangular images;
making, based on the first and second position coordinates extracted from each of the plurality of first and second rectangular images, a first decision that one of the first rectangular images and one of the second rectangular images whose positions are within a predetermined distance are an obverse and reverse pair; and
making, based on feature amounts extracted from the first and second rectangular images in accordance with the result of the first decision, a second decision that one of the first rectangular images and one of the second rectangular images whose matching degree of the feature amounts extracted therefrom is greater than or equal to a predetermined value are an obverse and reverse pair.

* * * * *